United States Patent
McGrane et al.

(10) Patent No.: US 6,496,927 B1
(45) Date of Patent: Dec. 17, 2002

(54) METHOD AND CONFIGURING A USER INTERFACE FOR CONTROLLING A CONTROLLED DEVICE BASED UPON A DEVICE CLASS

(75) Inventors: William B. McGrane, Dallas; Mark S. Lewno, Garland; Robert D. Ward, Carrollton, all of TX (US)

(73) Assignee: AMX Corporation, Richardson, TX (US)

(*) Notice: Subject to any disclaimer, the term of this patent is extended or adjusted under 35 U.S.C. 154(b) by 0 days.

(21) Appl. No.: 09/329,019

(22) Filed: Jun. 9, 1999

(51) Int. Cl.[7] ................................................. G06F 9/00
(52) U.S. Cl. ......................... 713/1; 713/100; 709/220; 710/8
(58) Field of Search ............................ 713/1, 100, 300, 713/323, 330, 340, 5; 340/825.22; 345/349; 709/221, 220; 710/8, 9, 11, 13, 14, 104

(56) References Cited

U.S. PATENT DOCUMENTS

| | | | |
|---|---|---|---|
| 5,119,479 A | * | 6/1992 | Arai et al. .................... 395/275 |
| 5,410,326 A | | 4/1995 | Goldstein |
| 5,491,797 A | * | 2/1996 | Thompson et al. ..... 395/200.03 |
| 5,630,079 A | * | 5/1997 | McLaunghlin ............... 395/335 |
| 5,648,813 A | | 7/1997 | Tanigawa et al. |
| 5,675,756 A | * | 10/1997 | Benton et al. ............... 345/349 |
| 5,959,536 A | * | 9/1999 | Chambers et al. ........... 340/636 |
| 6,008,735 A | * | 12/1999 | Chiloyan et al. ....... 340/825.22 |
| 6,023,762 A | * | 2/2000 | Dean et al. .................. 713/193 |
| 6,055,368 A | * | 4/2000 | Kunioka ........................ 703/13 |
| 6,133,847 A | * | 10/2000 | Yang ..................... 340/825.22 |

FOREIGN PATENT DOCUMENTS

| | | |
|---|---|---|
| EP | 0 626 635 A2 | 11/1994 |
| EP | 0 939 517 A1 | 9/1999 |
| WO | WO 00/28403 | 5/2000 |

\* cited by examiner

Primary Examiner—Jeffrey Gaffin
Assistant Examiner—Rijue Mai
(74) Attorney, Agent, or Firm—Wei Wei Jeang; Munsch Hardt Kopf & Harr, P.C.

(57) ABSTRACT

Electronic devices (16, 17) can be controlled by a control unit (11), which in turn is responsive to infrared commands (33) received from a remote (12) utilized by an operator. The remote has a touch-panel display (49), on which images can be displayed. The images are part of a user interface created by a program (86) running in a personal computer (13). An operator enters into the computer an identification of the devices (16, 17) which are to be controlled, and the computer then takes predefined images and automatically customizes them for the these devices. Some of the images have a size which is less than the overall size of the display, so that when one of these images is displayed, a portion of at least one other image will also be visible. For a controlled device which does not recognize each of a discrete power on, discrete power off and power toggle command, the computer automatically effects configuration so as to provide all three functions using a subset of commands which the controlled device actually does recognize.

11 Claims, 15 Drawing Sheets

METHOD AND CONFIGURING A USER INTERFACE FOR CONTROLLING A CONTROLLED DEVICE BASED UPON A DEVICE CLASS

TECHNICAL FIELD OF THE INVENTION

This invention relates in general to a method and apparatus for operationally controlling at least one device in response to input provided by an operator through a user interface and, more particularly, to an arrangement which can be used to configure the system and user interface.

BACKGROUND OF THE INVENTION

There are various environments which each include a number of electrical or electronic components, where it is desirable to be able to control each of these components through a single user interface. For example, a corporate boardroom may be used for multi-media presentations to clients or management, and may include equipment such as a video cassette recorder, laser disk player, compact disk player, cassette tape deck, digital satellite system, slide projector, video projector, AM/FM receiver with speaker system, two retractable projection screens, and dimmable overhead lighting. Similarly, a home theater environment may include a large-screen television, an AM/FM receiver with speaker system, a compact disk player, a laser disk player, a video cassette recorder, and a cassette tape deck.

In order to facilitate central control of several electrical or electronic devices, an existing system includes a control unit which is operationally coupled to each of the devices to be controlled, and a hand-held remote with a touch-panel display. The touch-panel display is used to present a user interface to the operator, through which the operator can specify how the control devices are to be controlled. In response to input from the operator, the remote sends wireless signals to the control unit. The control unit responds to these wireless signals by sending commands to the controlled devices, for example by issuing infrared commands that the controlled devices are inherently designed to recognize and implement. In order to configure the control unit and the remote, a personal computer is used. While this existing arrangement has been generally adequate for its intended purposes, it has not been satisfactory in all respects.

More specifically, the user interface is generated from predefined images or pages for the touch-panel, which are usually designed to work with a number of devices in a given equipment class. For example, a particular page may be designed for use with a number of different AM/FM receivers, which are all classified in a common receiver class. However, a given receiver may not be able to carry out all of the functions which the predefined page is designed to provide. Thus, the resulting user interface may have pages which include operator actuatable buttons that are visible to the user but that do not do anything, because they correspond to a function which the particular receiver is not capable of carrying out. Problems of this type are aesthetically undesirable. Another consideration is that the existing system has no mechanism for providing a page which takes up only a part of the display, in order that a portion of another page can also be viewed at the same time, at least without substantial manual programming work.

A further consideration relates to power control for controlled devices. It is desirable to be able to carry out a discrete power on, a discrete power off, and a power toggle operation for many types of controlled devices, but some of these devices do not inherently recognize all three types of commands. For example, a given device may recognize only the power toggle command, or may recognize only the discrete power on and off commands. The known system has no convenient capability for implementing all three functions for a device which is not capable of inherently performing all three functions. This presents a problem in a situation where it is desirable to be able to use a single button in the user interface to turn on power to most or all system components, or to turn off power to most or all system components. For example, if a particular device inherently has only a power toggle capability, it is difficult to know whether that device is already on or off at a given point in time when it is desirable to force it to an on state or an off state. The existing system is not capable of readily and efficiently providing the capability to do all three functions with respect to a particular controlled device. At best, a substantial amount of manual effort would be required for configuration and programming in order to achieve this result.

SUMMARY OF THE INVENTION

From the foregoing, it may be appreciated that a need has arisen for a method and apparatus for configuring a system and a user interface so as to control one or more control devices. The present invention is provided to address this need. A first form of the present invention involves: maintaining a device database which contains respective device information for each of a plurality of different devices; maintaining an initial interface definition for a device class which includes a plurality of the devices in the database; permitting an operator to select a device in the device class to be the controlled device; automatically preparing a modified interface definition by modifying the initial interface definition based on the device information in the device database which corresponds to the controlled device; and controlling the user interface portion using an interface control definition which is a function of the modified interface definition.

A further form of the present invention relates to configuration of a user interface portion of a system which controls a controlled device, where the user interface portion includes a display. This form of the invention involves: maintaining a device database which identifies a plurality of different devices; maintaining an interface database which includes information defining a plurality of images each capable of being displayed on the display, each of the devices in the device database being associated with at least one of the images, and at least one of the images having a reduced size smaller than the size of the display; permitting an operator to select as the controlled device a device in the device database which is associated with a first image which has the reduced size; preparing an interface control definition which includes at least two images, one of which is the first image, the interface control definition displaying the first image by overlaying the first image over at least a portion of a second image which is one of the images in the interface control definition other than the first image; and controlling the user interface portion using the interface control definition.

Yet another form of the present invention involves: maintaining a device database which contains respective device information for each of a plurality of different devices, the device information including for each of the different devices an indication of whether that device is responsive to each of a power on command, a power off command and a power toggle command; permitting an operator to select as the controlled device a device in the device database;

automatically evaluating the device information in the database to determine whether the controlled device is responsive to each of the power toggle command and the power on and off commands; responding to a determination that the controlled device is responsive to the power toggle command and nonresponsive to the power on and power off commands by automatically adding to the system configuration a power sensor for the controlled device which detects a current power state of the controlled device; automatically preparing a control definition for the system which selectively effects power toggle control of the controlled device by transmitting the power toggle command to the controlled device, and which selectively effects discrete power on and power off control of the controlled device by interrogating the power sensor to determine the current power state of the controlled device and by then conditionally transmitting the power toggle command to the controlled device in dependence on the result of the interrogation of the power sensor; and controlling the system using the control definition.

Still another form of the present invention involves: maintaining a device database which contains respective device information for each of a plurality of different devices, the device information for each of the different devices including an indication of whether that device is responsive to each of a power on command, a power off command and a power toggle command; permitting an operator to select as the controlled device a device in the device database; automatically evaluating the device information in the database to determine whether the controlled device is responsive to each of the power toggle command and the power on and off commands; responding to a determination that the controlled device is responsive to the power on and off commands but nonresponsive to the power toggle command by automatically preparing a control definition for the system which includes a variable that mirrors the current power state of the controlled device, which selectively effects power on and off control of the controlled device by selectively transmitting the power on and off commands to the controlled device while updating the variable to indicate the current power state of the controlled device, and which selectively effects power toggle control of the controlled device by transmitting one of the power on and off commands to the controlled device in dependence on the current state of the variable and by inverting the state of the variable; and controlling the system using the control definition.

BRIEF DESCRIPTION OF THE DRAWINGS

A better understanding of the present invention will be realized from the detailed description which follows, taken in conjunction with the accompanying drawings, in which.

DETAILED DESCRIPTION OF THE INVENTION

Figure 1:
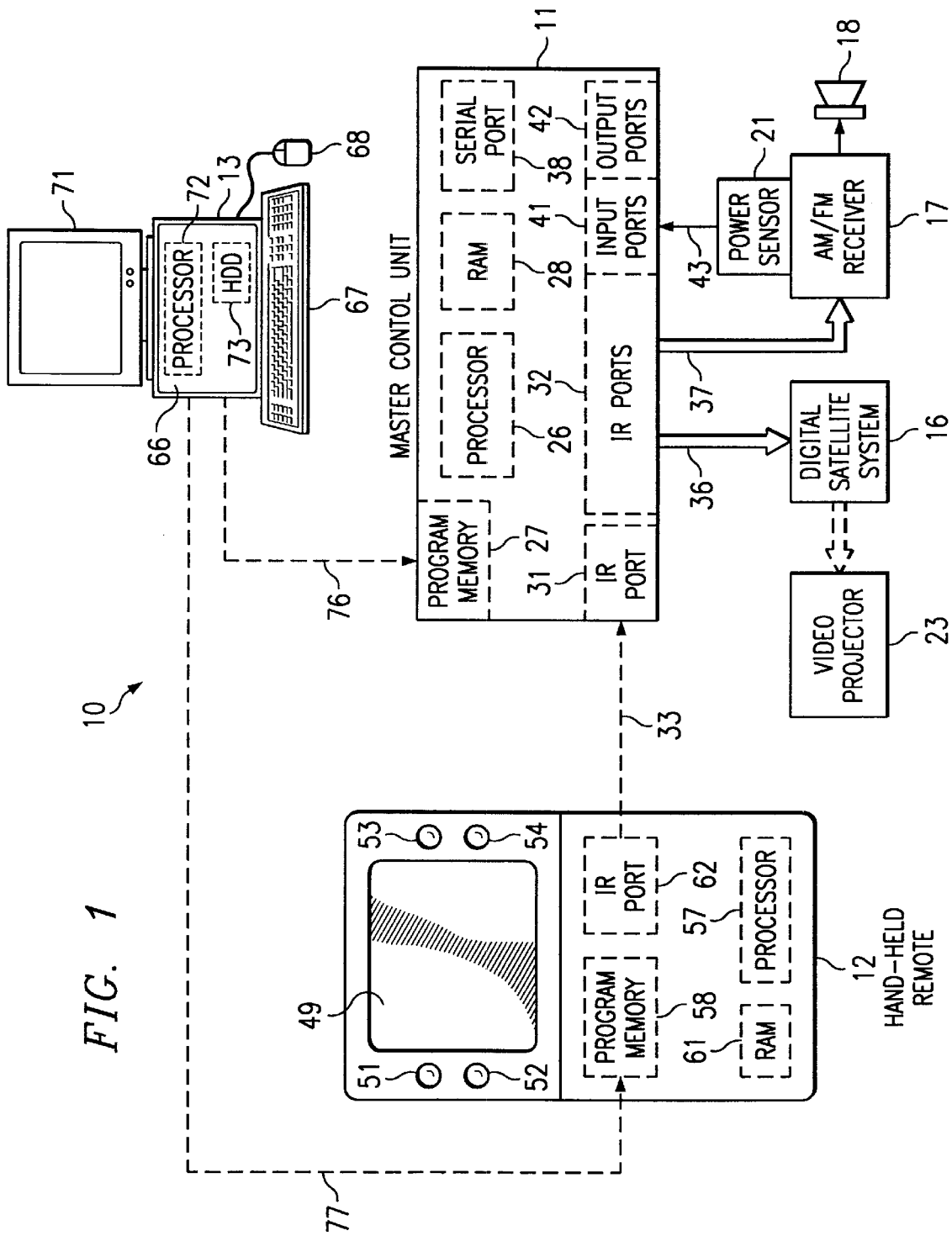
FIG. 1 is a block diagram of a system which embodies the present invention.

FIG. 1 shows a system 10 which embodies the present invention, including a master control unit 11, a hand-held remote 12, a personal computer 13, a digital satellite system (DSS) 16, an AM/FM receiver 17 with an associated speaker system 18, and a power sensor 21. The DSS 16 serves as a video source for a video projector which is shown at 23. The video projector 23 is not necessary to an understanding of the present invention, and is therefore shown in broken lines in FIG. 1, and is not described in detail. An operator uses the hand-held remote. 12 to specify how the master control 11 should carry out control of the various system components, as discussed in more detail later.

The master control unit 11 and the hand-held remote 12 are used to control various pieces of electrical or electronic equipment, for example equipment provided in a corporate boardroom or in a home theater environment. In this regard, a corporate boardroom is often used to make presentations or for purposes of video conferencing, and electrical or electronic devices there may include one or more retractable projection screens, a video projector, a slide projector, one or more video cassette recorders (VCRs), a DSS (such as that shown at 16), an AM/FM receiver with associated speaker system (such as that shown at 17–18), a compact disk player, and overhead lighting with dimming capability. Similarly, a home theater environment might include a large-screen television, a DSS, an AM/FM receiver with associated speaker system, a cassette tape deck, and a compact disk player. In any such application, the master control unit 11 can be operatively coupled to and exercise at least partial control over various electrical or electronic components. Only two components of controlled equipment are shown in FIG. 1, namely the DSS 16 and the receiver 17. This is for simplicity in explaining the basic principles of the present invention. However, it will be recognized that the master control unit 11 can be used to control a much larger number of electrical and electronic devices and systems, in a variety of different configurations.

The master control unit 11 includes a microprocessor 26 which is a commercially available device, and a program memory 27 which is a nonvolatile memory that may be reprogrammed, such as a flash random access memory. The program memory 27 includes the program executed by the microprocessor 26, as well as other data or tables which do not change during normal operation of the master control unit 11. The control unit 11 further includes a random access memory (RAM) 28, in which the processor 26 can store variables and other data that can change during normal system operation.

The master control unit 11 further includes an infrared (IR) port 31, through which it can receive wireless infrared commands 33 from the hand-held remote 12. The unit 11 also includes several IR ports 32, which the unit 11 can use to output IR commands. In this regard, many electronic components are inherently designed to be responsive to IR commands issued by a hand-held remote. For example, most commercially available televisions are delivered with a hand-held remote which issues IR commands that can select a channel, change the volume, mute the sound, turn the power on and off, and so forth. The same is true of many commercially available VCRs, AM/FM receivers, cassette tape decks, compact disk players, slide projectors, and so forth. The DSS 16 and receiver 17 in FIG. 1 are each commercially available devices of this type, which are responsive to infrared commands.

In the system of FIG. 1, one of the IR ports 32 is coupled by a fiber optic cable 36 to the DSS 16, and another of the IR ports 32 is coupled by a fiber optic cable 37 to the receiver 17. Although the DSS 16 and receiver 17 are each capable of receiving IR commands transmitted without a cable, the cables 36 and 37 are nevertheless used in the disclosed embodiment. This effectively eliminates the possibility that a transmitted IR command might not be recognized, for example because some boardrooms or other environments are large and make it necessary for the control unit 11 to be spaced from the controlled devices by a distance which exceeds the typical range for reliable wireless IR transmission of commands. Although this discussion focuses on the use of IR commands, some devices are capable of being controlled in an equivalent manner by serial commands, which the control unit 11 can issue through a serial interface 38, such as an RS232 serial interface.

The master control unit 11 has several input ports 41, each of which can receive a respective electrical signal from a remote device. In FIG. 1, one of the input ports 41 is coupled at 43 to the output of the power sensor 21. The power sensor 21 is capable of determining whether the receiver 17 is currently powered on. The precise manner in which this is accomplished will depend on the particular receiver. For example, if the receiver has a switched 110V outlet, the power sensor could monitor whether or not the switched outlet has power. Alternatively, the power sensor could monitor whether there is electrical activity on some other output of the receiver. There are other ways in which the power sensor could detect whether the receiver currently is powered on.

The control unit 11 further includes several output ports 42, each of which produces an electrical signal that can control some other device. For example, although not specifically shown in FIG. 1, different output ports 42 could be respectively used to control a dimmer for the overhead lights, to control a motor which raises and lowers a projection screen, to control a relay device which turns power on and off to a device which does not have the capability to control its own power in response to IR commands, and so forth.

The hand-held remote includes a visual display 49, of a type commonly known as a liquid crystal display (LCD). In the disclosed embodiment the LCD display 49 is a color display, but it could alternatively be a black and white display, for example to reduce the cost of the remote 12. The LCD display 49 is of a type known as a touch-panel display, in that an operator can touch the surface of the display 49 with a finger, and the remote 12 will detect which location on the display was touched by the operator. Therefore, as discussed in more detail later, an operator tells the remote 12 what to do primarily by touching the display 49 in different locations with a finger. In addition, however, the remote 12 has in the vicinity of the display 49 four external buttons 51–54, which are each a momentary push-button switch, and which can each be actuated by an operator.

Internally, the remote 12 includes a microprocessor 57 which is a commercially available device, and a program memory 58 which stores the program executed by the processor 57, as well as other data and information that does not change during normal system operation. Like the program memory 27, the program memory 58 is a non-volatile memory of a type which can be reprogrammed, such as flash random access memory. The remote 12 also includes some standard random access memory (RAM) 61, in which the processor 57 can store variables and other data that are subject to change during normal system operation.

In addition, the remote 12 includes an IR port 62, which is used to send wireless IR commands at 33 to the IR port 31 in the master control unit 11. The IR transmissions 33 are true wireless transmissions, so that the remote 12 can be freely moved within the boardroom or other operational environment. The remote 12 provides a convenient single hand-held unit which a person can use to operate all of the equipment coupled to the master control unit 11. The remote 12 is powered in a know manner by a battery, which is not illustrated in FIG. 1.

Turning now to the personal computer 13, the computer 13 would not be present during normal operation of the control unit 11 and remote 12. Instead, the computer 13 is used during system setup for the purpose of generating customized programs which are to be executed by the processor 26 and processor 57 during normal operation, and which are downloaded to and stored in the program memories 27 and 58. Computer 13 is depicted in FIG. 1 as a desktop unit, but it will be recognized that it could alternatively be a personal computer of the type commonly known as a laptop or notebook computer. The capability of the system 13 to generate the programs for the memories 27 and 58 is indicated diagrammatically by the broken lines at 76 and 77. The hardware of the personal computer 13 is entirely conventional, and includes a system unit 66, a keyboard 67, a pointing device 68 such as a mouse or trackball, and a cathode ray tube (CRT) display 71. The system unit 66 includes, among other things, a microprocessor 72 of a known type, and a hard disk drive (HDD) 73.

The embodiment disclosed in FIG. 1 includes the capability for the master control unit 11 to be simultaneously controlled by two or more of the hand-held remote units 12. However, to facilitate an understanding of the present invention, only one hand-held remote 12 is described in detail and shown in FIG. 1. When the remote 12 sends an IR command at 33 to the control unit 11, the IR command includes two basic components. First, it includes a code unique to the particular remote 12, so that the control unit 11 knows which remote 12 generated the command. Second, the IR command includes a channel code. The channel code tells the control unit 11 what it is that the remote 12 wants the control unit 11 to do. Stated differently, a unique channel code is assigned to each function which the remote 12 is permitted to instruct the control unit 11 to do. Thus, each IR commands sent at 33 by the remote 12 includes a single short command code, which is all that the control unit 11 needs in order to know exactly what it should do. These channel codes are not predefined, but instead are assigned by the personal computer 13 as it is finishing up the programs which will be loaded into the memories 58 and 27 of the remote 12 and the control unit 11. In essence, the personal computer 13 identifies all of the tasks which the remote 12 will permitted to instruct the control unit 11 to do in the particular system, then sequentially numbers these tasks with channel codes, and then completes the programs for the memories 58 and 27 using these channel codes, so that the remote 12 and control unit 11 both know exactly which task corresponds to which channel code.

Figure 2:
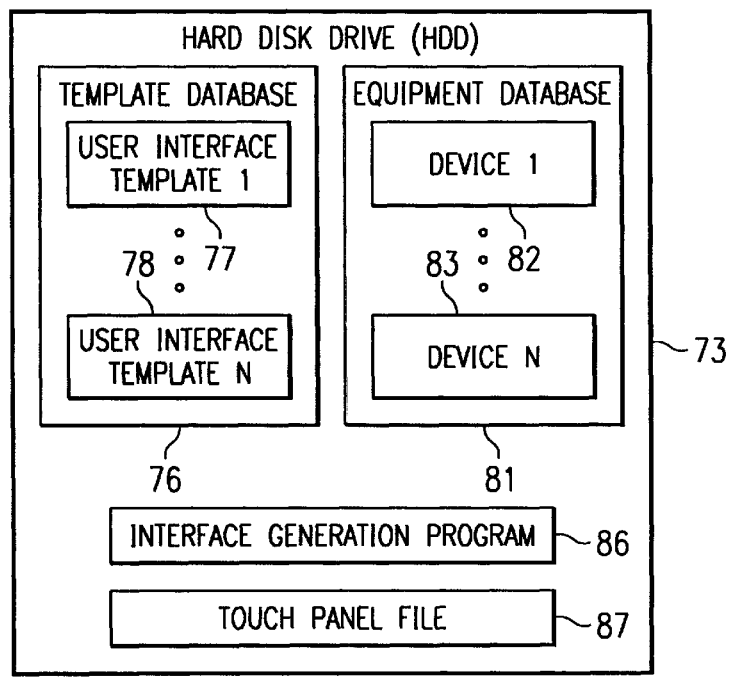
FIG. 2 is a diagrammatic view of certain information stored on a hard disk drive which is a component of the system of FIG. 1.

FIG. 2 is a diagrammatic view of the HDD 73 in the personal computer 13, and diagrammatically depicts some of the information stored on the HDD 73. In particular, there is a template database 76 which is stored on the HDD 73, and which includes a plurality of user interface templates, two of which are shown at 77 and 78. The information in the templates 77–78 will be discussed in more detail later. The HDD 73 further includes an equipment database 81, which includes a plurality of device definitions, two of which are shown diagrammatically at 82 and 83. Each of the definitions corresponds to a respective commercially available device, two examples of which are the DSS 16 and receiver 17 in FIG. 1. The type of information in each of the device definitions 82 and 83 will be discussed in more detail later.

The HDD 73 further includes an interface generation program 86. The processor 72 in personal computer 13 executes program 86 in order to generate the executable programs which are stored in the memories 27 and 58, and which define the interface presented to an operator by means of the display 49 and the external buttons 51–54. The HDD 73 further includes a touch-panel file 87. The touch-panel file 87 is generated by the program 86 as the program creates a user interface for a particular system, and the file may thereafter be saved in order to have a record of the definition for that particular interface, even after the interface has been prepared and the memories 27 and 58 have been appropriately programmed. If the personal computer 13 is used to set up two or more systems which each include a respective master control unit 11 and hand-held remote 12, the HDD 73 may include a touch-panel file 87 for each such system. For convenience and clarity in the present disclosure, however, only a single touch-panel file 87 is shown in FIG. 2.

Turning now in more detail to the equipment database 81, there are various different equipment classes, examples of which are televisions, slide projectors, VCRs, compact disk players, receivers, digital satellite systems, and so forth. For each such class of equipment, there are a plurality of manufacturers who are commercially marketing devices that may properly be categorized as equipment of that particular type or class. Further, each manufacturer will typically be marketing several different devices in each class, each such device having a different model number. The equipment database 81 includes a respective device definition for each commercially available device which has been determined to be compatible for use with the master control unit 11. The equipment database 81 may be updated from time to time in order to take into account new devices that come onto the market.

Table 1 lists information which is present in each of the device definitions 82–83 in the database 81. In particular, as shown in Table 1, each device definition identifies the equipment class of the associated device, the name of the manufacturer, and the particular manufacturer's model number for that device. Then, the device definition identifies the particular control technique to be used with that device. In most cases, this will involve the transmission of IR commands, but it could alternatively be effected in another manner, for example by transmitting serial commands through an RS232 serial interface using serial port 38. The device definition also includes control data, which is a definition of the specific infrared patterns or codes to which this particular device will respond. In the disclosed embodiment, the control data is stored in the form of forty-two common functions arranged in a predetermined order, followed by any additional functions which are unique to the particular piece of equipment. Table 2 lists the forty-two common functions, in their predetermined order.

The common functions include play, stop, pause, record, increase volume, decrease volume, and the like, which are found on a wide variety of devices falling within a variety of equipment classes. If a particular device does not support one of the common functions, then the corresponding entry in the control data includes a special value or code, to effectively indicates that there is no remote command which will cause the particular device to do that particular function. As to all other functions, or in other words functions which the device will implement in response to remote commands, each corresponding entry in the control data includes information defining the particular code which must be sent to the device in order to cause that particular device to carry out the function in question.

Table 1 also includes attribute information used to customize the interface for the particular device, as discussed later. In addition, Table 1 includes a list of available commands for the particular device, as discussed in more detail later.

Looking now in more detail at the template database 76, each of the user interface templates 77–78 provides information which can be used to generate a user interface for the master control unit 11 and hand-held remote 12. The templates differ primarily in terms of aesthetic considerations. For example, images which are to be displayed on the display 49 of the remote 12 is referred to as pages, and a page may take up all or only a portion of the area of the display 49. Some templates may be configured to generate color pages suitable for use with the color LCD display 49 in the disclosed embodiment. Other templates may generate gray-scale pages which are suitable for use with a less expensive black and white LCD display. Similarly, some templates produce pages which are optimally configured for one particular environment, such as a corporate boardroom, while other templates produce pages which are optimally configured for other environments, such as a home theater. Each of the templates 77–78 provides the template information which is needed to generate a fully functionally user interface, and an operator will select one of the templates for use in generating a given user interface. For purposes of simplicity and clarity in describing the disclosed embodiment, only the template 77 will be described in detail below.

In order to ensure that the explanation of the template 77 is clear, it will be helpful to begin with a brief and general explanation regarding the pages which the remote 12 can display to an operator on the touch-panel LCD display 49. A page is a graphical image which can be visually presented on the display 49, and which may use the entire area of the display 49 or only a portion of that area. If a first page is being displayed and a second page is then presented for display, the second page will cover up any portion of the first page which is in the region of the display that corresponds to the second page. For example, if the second page takes up the entire display 49, none of the first page will be visible. On the other hand if the second page takes up only a portion of the display, any portion of the first page which appears on the remainder of the screen will still be visible. In either case, if the second page is thereafter removed from the display, the remote 12 will again display the portion of the first page which was covered by the second page. In the disclosed embodiment, a page which takes up less than the entire screen is referred to as a "pop-up" page. Each page may include one or more regions which are called buttons. If an operator touches a portion of the display 49 which is currently displaying a button, the remote 12 will detect this and then take some form of action which is associated with that button. Typically, touching a button will result in one of two different types of actions.

The first type of action is transmission at 33 of an IR command containing a channel code associated with that button, which will cause the control unit 11 to carry out the task associated with that channel code. The second type of action does not result in generation of an IR command at 33, but instead tells the remote 12 to change the current page display, either by displaying an additional page, or by removing the current page from the display. Both of these types of action are referred to herein as a page flip. The remote 12 is also capable of causing automatic page flips. For example, if the operator does not interact with the remote 12 for a predetermined period of time, some pages will be automatically removed from the display 49, thereby causing the previously-displayed page information, which was covered by the removed page, to again be visible.

A button on a first page which causes a flip to a second page is called an off-page button of the second page. The first page has a region which is called a button region and includes the off-page button for the second page. The button region may also contain off-page buttons for other pages. In the context of the exemplary system which is shown in FIG. 1, and as will be described in more detail later, the remote 12 is capable of displaying on the display 49 a source select page which has a button region that includes two buttons, one of which corresponds to the DSS 16, and the other of which corresponds to the receiver 17. If an operator presses the button corresponding to the DSS 16, the remote 12 will flip to a new page containing buttons that can be used to control DSS 16, whereas if the operator presses the button corresponding to the receiver 17, the remote 12 will flip to a new page having several buttons that can be used to control the receiver 17. The personal computer 13 does not know in advance what specific devices 16 and 17 will be selected for use with the master control unit 11 of a given system. Thus, the operator will need to identify for the computer 13, in a manner discussed in more detail later, the specific devices 16 and 17 which will be present in a given system. As each such device is identified, a page corresponding to that device needs to be added to the user interface, and the off-page buttons which will cause a flip to that new page need to be added to one or more other pages, namely in the button regions on those pages which are provided specifically so that off-page buttons can be added in those regions. This is discussed in more detail later.

Referring again to FIG. 2, the user interface template definition 77 includes certain information which is shown in Tables 3, 4 and 5. More specifically, Table 3 shows that the template definition includes a separate definition for each button region which is capable of being used on any page within that template. In general, the definition of each button region includes information such as a unique region identification number for that region, the size of the button region, where the region is located on each page which subscribes to use of that button region, and what to do if the number of off-page buttons added to that button region exceed the available space for that button region. A given button region may appear on more than one page in the template, but will have the same size and relative position on each such page. For example, if a button region definition indicates that the button region is to appear adjacent the upper left corner of a page, each page which subscribes to use of that particular button region will have that button region located near the upper left corner of the page.

Table 3 also shows that the template definition includes attributes for off-page buttons. This is a resource area serving all pages in the template, which provides definition information for each type of off-page button that can be used in the template. For example, this will include a definition of the size of the button, any text which is to appear on the button, any bitmap or icon which is to appear on the button, and so forth. In the disclosed embodiment, an icon is defined to be a bitmap which is of a predetermined size.

As shown in Table 3, the template definition also includes a plurality of separate page definitions. In general, these include several pages which do not relate to specific control devices such as those shown at 16 and 17, and which are therefore provided in every user interface generated by the personal computer 13. In addition, each class of equipment has at least one page definition associated with it. Each time a device falling within that particular equipment class is added to the system configuration, the page definition for each corresponding page is taken into account in generating the user interface. Sample page definitions are discussed in more detail later.

Table 4 shows information which is in each of the page definitions present in the selected template definition. More specifically, each page definition includes a list of off-page buttons which are associated with the subject page, or in other words a list of the buttons which are to be provided on other pages in order to cause a flip to the subject page. The entries in this off-page button list each include a button region identification number, which serves as a link to one of the button region definitions present in the template definition (Table 3), and also each include a number which serves as a unique link to a respective one of the definitions of attributes for off-page buttons (Table 3), thereby identifying the size and graphical appearance of the off-page button.

Next, the page definition (Table 4) includes a list of button region identification numbers, which identify button regions that are present on the subject page. Each such button region identification number serves as a link to a respective button region definition in the template definition (Table 3). Next, Table 4 includes an initial image definition for the subject page, or in other words an initial definition of the graphical appearance which the page will have when displayed, although this initial appearance is subject to modification, as discussed later. Next, each page definition includes an equipment class identification, which indicates the class of equipment that this page has been designed to be used with. As mentioned above, examples of equipment classes include cassette tape decks, laser disk players, compact disk players, receivers, televisions, slide projectors, and so forth.

Next, Table 4 indicates that each page definition includes an entry which is an identification of a particular piece of equipment. The specific setting for this identification is not present in the master page definition in the template database 76. Instead, the master page definition essentially defines a place in the page definition where a unique identification can be added later, in order to identify a particular piece of equipment. For example, a given system may include two different VCRs, which are both in the same equipment class. As a result, each page definition associated with that equipment class will be used twice in generating a user interface for the overall system, and it is thus necessary to be able to tell these otherwise identical page definitions from each other. Accordingly, each time the master page definition for a VCR is copied to the touch panel file 87, the particular equipment identification in the copy of the page is uniquely set so as to uniquely identify the associated VCR. For example, one identification might be set to "VCR1", and the other to "VCR2".

Next, in Table 4, each page definition includes an entry which is a default timeout. This is a time period, such as five seconds, following which the page will be removed from the display 49 of the remote 12 if the operator has not interacted with the remote 12 during that interval of time. The default timeout may also be set to a value such as zero, in order to indicate that there is no timeout, or in other words that the page is to continue to be displayed until manually removed, regardless of whether or not the operator is interacting with the remote 12. Most pages will not use the timeout feature.

Next, the page definition includes a definition of each of one or more buttons which appear on the subject page. In this regard, it should be noted that this information relates to buttons which in fact will appear on the subject page, as distinct from the foregoing discussion of information in the page definition for off-page buttons, which are associated with the subject page but appear on a different page. Each of the button definitions includes information relating to a specific button appearing on the subject page, and the information present in each button definition is discussed in more detail in association with Table 5.

More specifically, with reference to Table 5, each button definition includes information defining attributes for the button, such as bitmap, icon and text attributes. The bitmap or icon attribute determines the graphical appearance of the button, and the text attribute identifies text which is associated with the button. Next, Table 5 indicates that the button definition includes a channel code. As discussed above, the channel code is not a predetermined value, but is assigned by the personal computer 13 as it is completing generation of the user interface. The channel code in Table 5 therefore effectively defines a storage location which is set at run time to identify the channel assigned by the personal computer 13 to the task which is associated with this particular button.

Next, the button definition includes an indication of the function code, if any, associated with this particular button. If present, this will be one of the function codes which are listed in Table 2, and which correspond to respective remote control codes that will be recognized by the device corresponding to the page on which this button appears. If this particular button is used for a purpose other than transmitting a remote command to a control device, then the function code in the button definition will be set to a special value such as zero, to indicate that none of the function codes in Table 2 are associated with this particular button.

Still referring to Table 5, the next item in the button definition is a feedback flag, which is used to facilitate control of the appearance of the button. In particular, the remote 12 is capable of displaying a button in a manner so that it appears to be in a normal unactuated position, or so that it appears to have been physically depressed. The feedback flag indicates whether the appearance of a button is to be controlled so as to depict the button as a momentary switch or a toggle switch. A momentary switch moves from its normal position to its depressed position in response to being operated, and then promptly returns to its normal position. In contrast, a toggle switch changes state from one of its normal and depressed positions to the other thereof each time it is operated, and stays in that other position until it is operated again.

Still with reference to Table 5, the next item in the button definition is a target page identification. Some types of control devices are associated with two or more pages, which essentially constitute a set of pages that are associated with that device. If a button on a given page is to cause a flip to another page within the same set, the target page identification entry in the button definition identifies the other page of that set to which the flip is to be made.

Next, each button definition includes a list of instructions, which define a sequence of tasks to be carried out by the control unit 11 in response to actuation of this particular button. This list of instructions is discussed in more detail later.

As explained above in association with Table 4, each page definition in the template 77 includes an initial image definition for the subject page. FIGS. 3–13 are each a diagrammatic view of the initial image definition for a respective page which is used in the exemplary system configuration shown in FIG. 1. The template 77 will actually include a number of additional initial page definitions, one example of which is the page definition for a compact disk player. Since the exemplary system configuration shown in FIG. 1 does not include a compact disk player, the page definition for a compact disk player is not shown and described. However, for purposes of the present invention, the appearance and handling of these various other pages is comparable to the manner in which the pages for the devices 16 and 17 are handled. Accordingly, the initial image definitions of other types of devices are not shown and described in detail.

Figure 3:
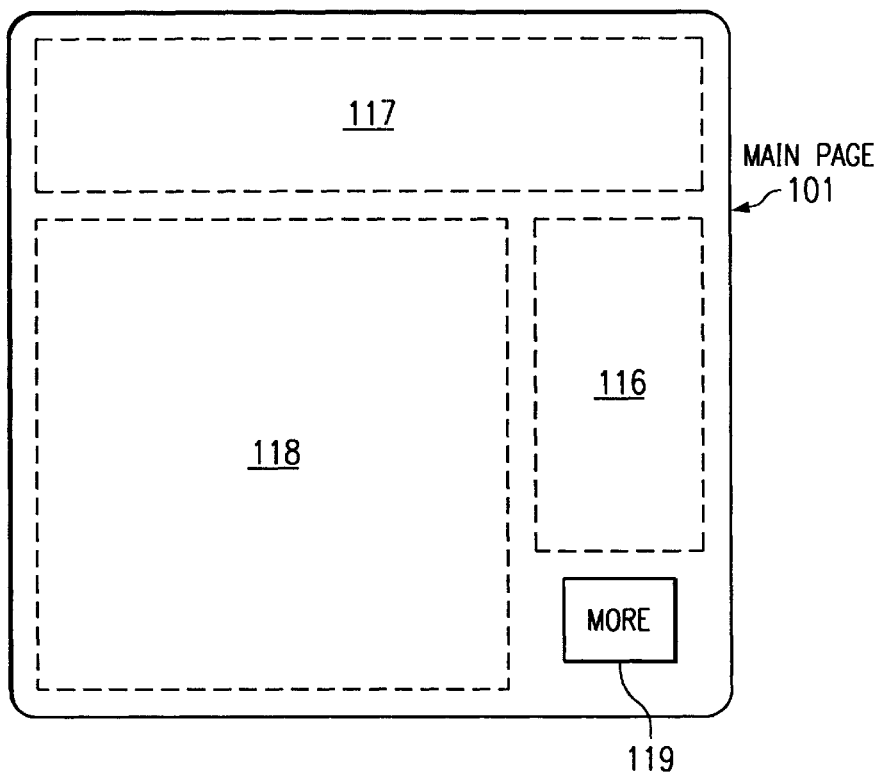
FIGS. 3–13 are diagrammatic views of initial images which are part of the information stored on the hard disk drive of FIG. 2.
Figure 4:
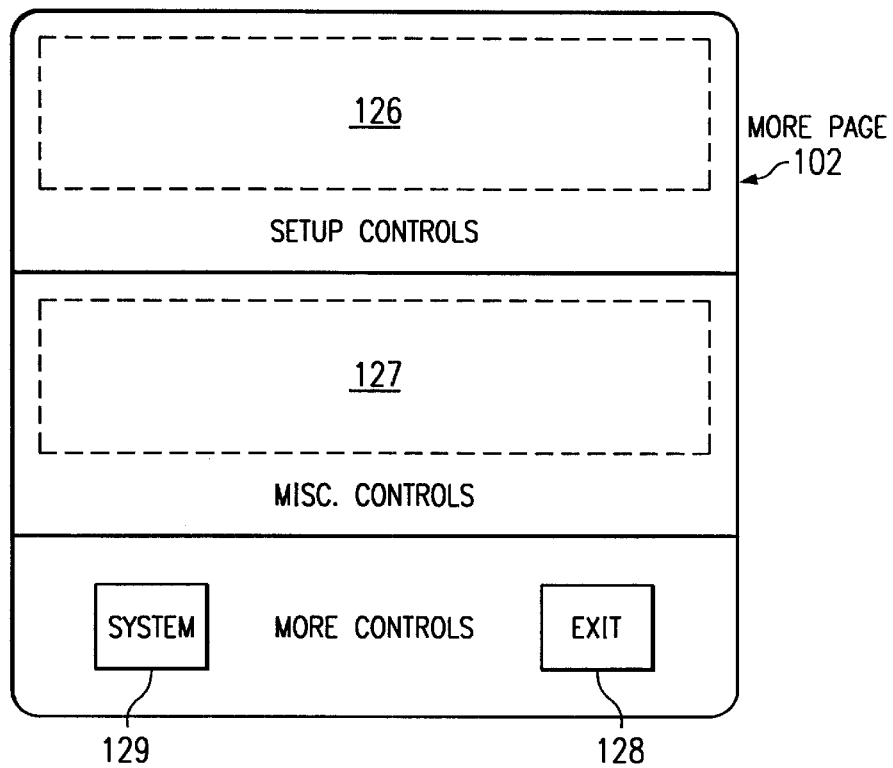
Figure 5:
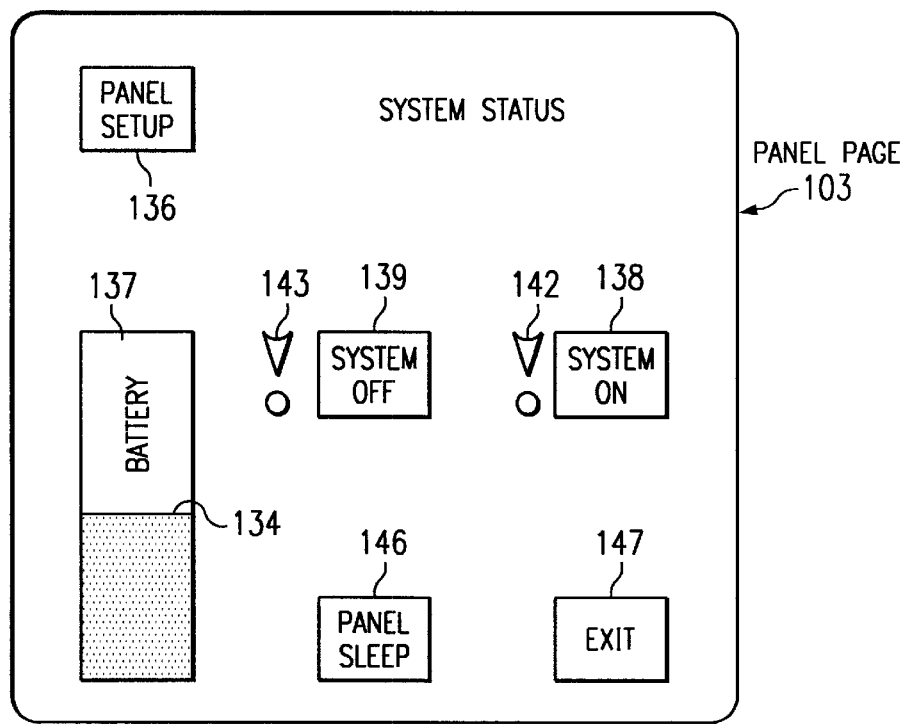
Figure 6:
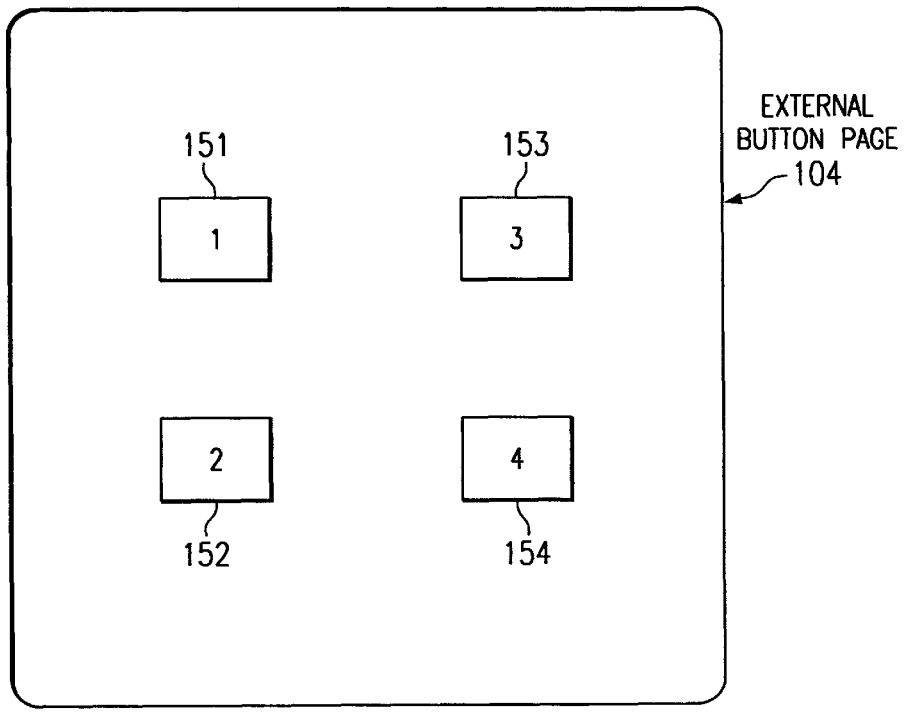
Figure 7:
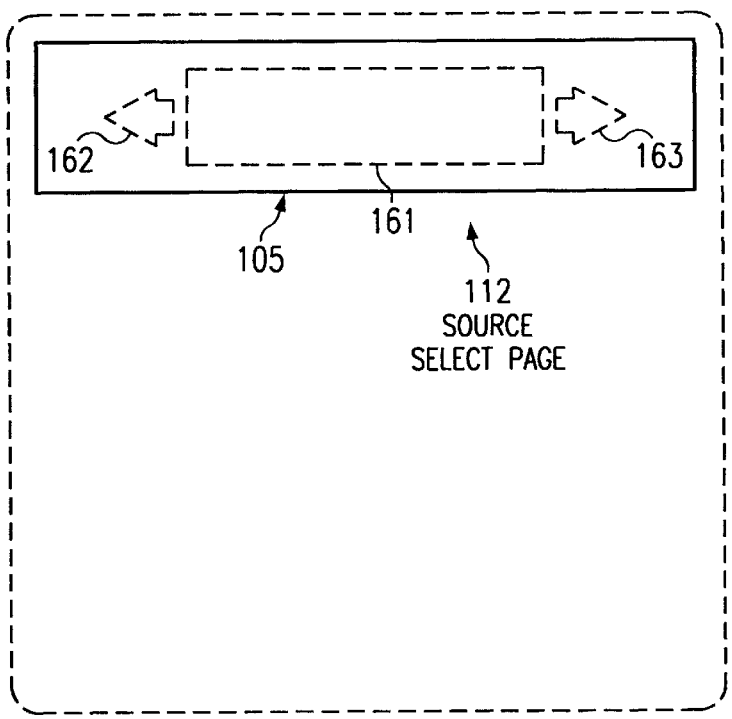
Figure 8:
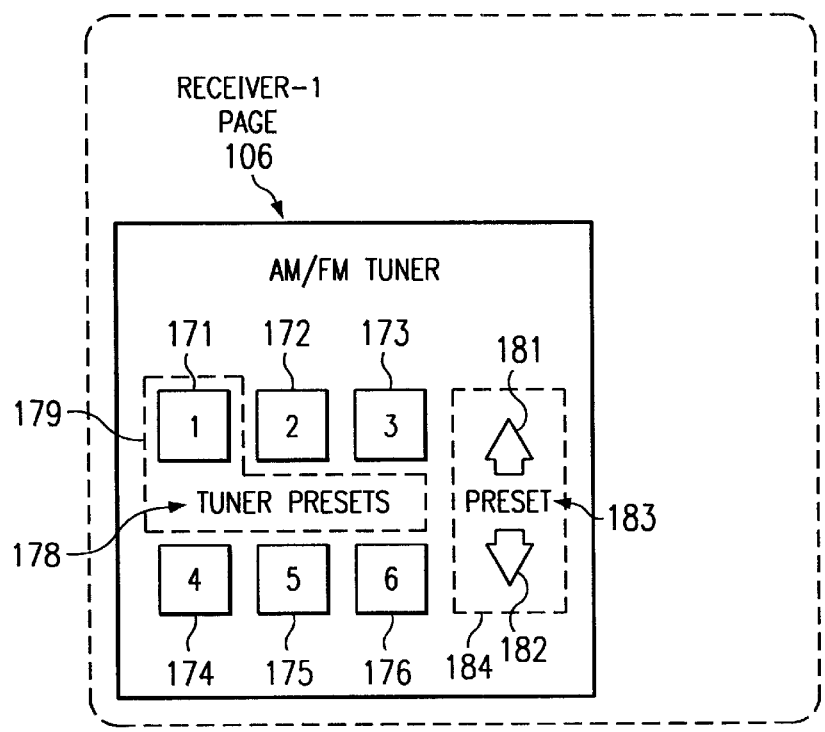
Figure 9:
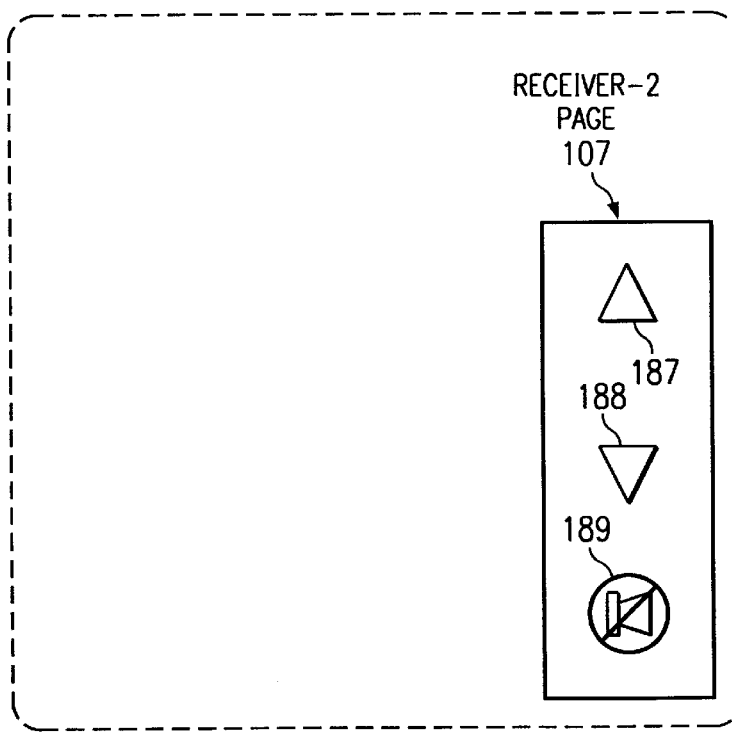
Figure 10:
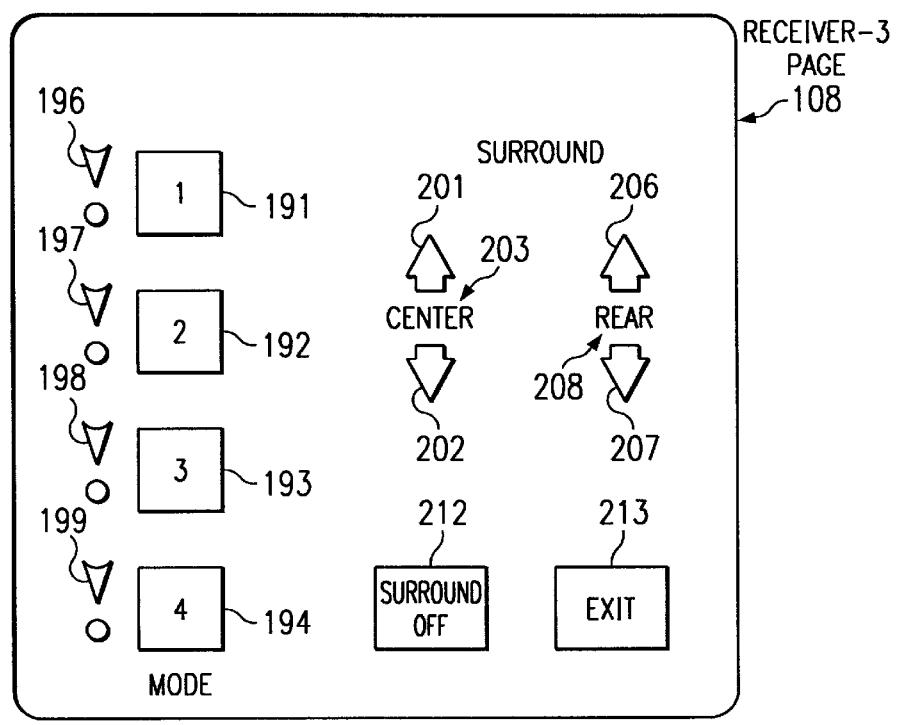
Figure 11:
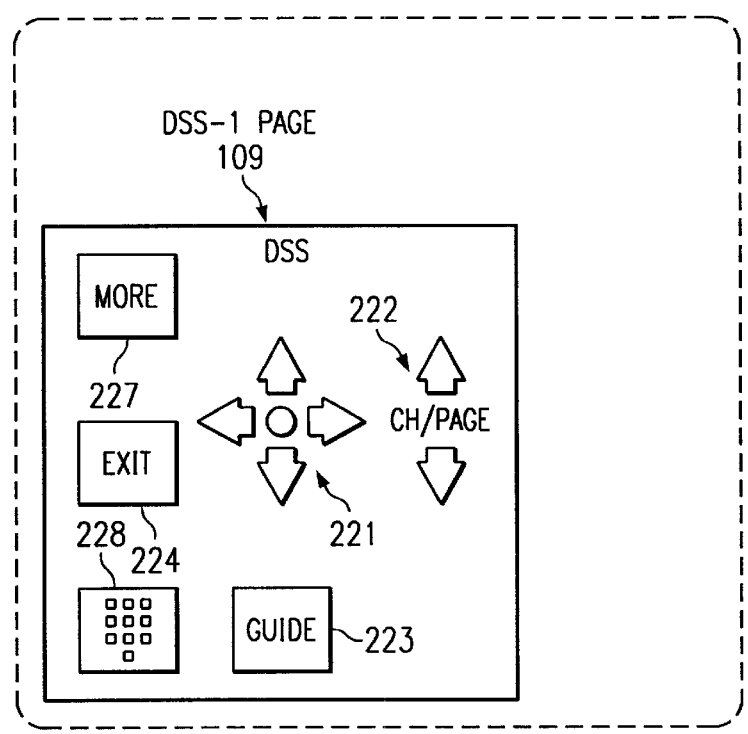
Figure 12:
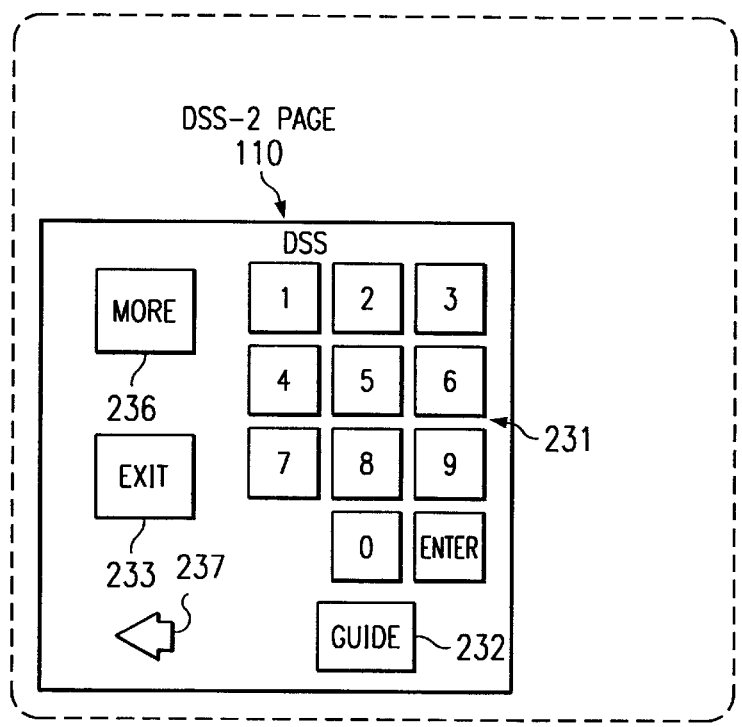
Figure 13:
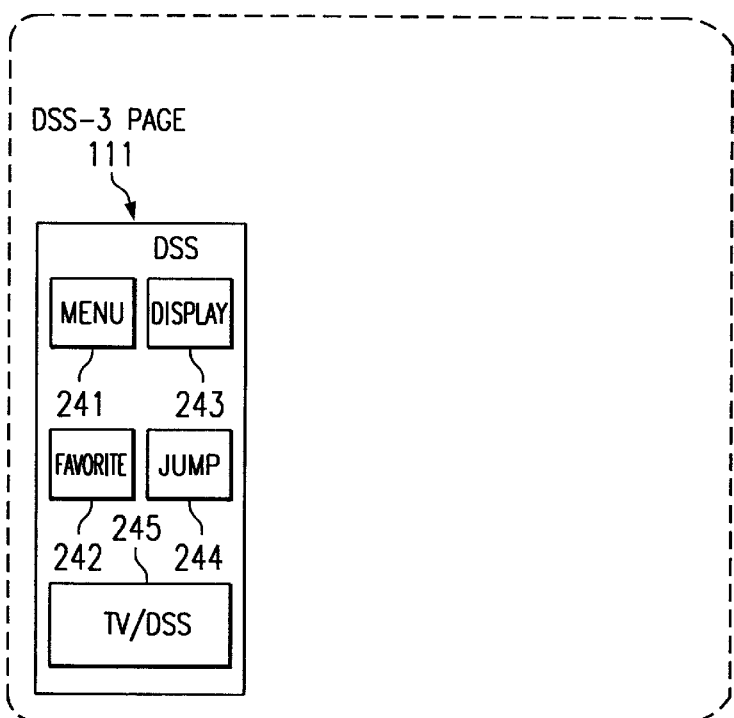

Turning in more detail to FIGS. 3–13, FIG. 3 shows a MAIN page 101, FIG. 4 shows a MORE page 102, FIG. 5 shows a PANEL page 103, FIG. 6 shows an EXTERNAL BUTTON page 104, FIG. 7 shows an SOURCE SELECT page 105, FIG. 8 shows a RECEIVER-1 page 106, FIG. 9 shows a RECEIVER-2 page 107, FIG. 10 shows a RECEIVER-3 page 108, FIG. 11 shows a DSS-1 page 109, FIG. 12 shows a DSS-2 page 110, and FIG. 13 shows a DSS-3 page 111. Where the size of a page is less than overall size of the display, the overall size of the display has been designated with a broken line, for example at 112 in FIG. 7, in order to indicate where the page will be located on the display when that page is being displayed. Page 104 (FIG. 6) is used to configure the system, as discussed later, but is never actually displayed during normal operation of the remote 12. In contrast, it should be noted that pages 101–103 and 108 (FIGS. 3–5 and 10) each take up the entire area of the display 49, whereas pages 105–107 and 109–111 (FIGS. 7–9 and 11–13) are each pop-up pages of a smaller size which take up only a portion of the area of the display 49.

Pages 101–105 in FIGS. 3–7 are default pages, which will always be included in the user interface, regardless of what particular devices are selected to be controlled. In contrast, pages 106–112 in FIGS. 8–13 are pages which correspond to specific types of devices, and which will be utilized in generating a user interface only if a device of that type is present in the particular system being configured. Here, pages 106–108 in FIGS. 8–10 correspond the class of equipment referred to as receivers, and will be used in generating the user interface for the exemplary system of FIG. 1 because that system includes the receiver 17. Similarly, pages 109–111 in FIGS. 11–13 correspond to the DSS class of equipment, and will be used in generating the user interface for the exemplary system of FIG. 1 because that system includes the DSS 16.

Each of the pages 101–111 will now be described in somewhat more detail. Referring first to FIG. 3, the MAIN page 101 includes an off-page button region 116. As described above, buttons can be added in the button region 116 during configuration of the user interface, in order to effect a flip from the page 101 to some other page. The MAIN page 101 also includes two areas which are designated by broken lines 117 and 118. The broken lines 117 and 118 are provided solely for purposes of facilitating a clear understanding of the present invention, by designating two areas of the main page that will typically be overlaid during normal system operation by other smaller pop-up pages. For example, the area 117 will be overlaid by the SOURCE SELECT page 105, and the area 118 will be overlaid by one or more of the pages 106 and 109–111. The MAIN page 101 also includes a MORE button 119, which effects a page flip to MORE page 102 shown in FIG. 4.

Turning to FIG. 4, the MORE page 102 includes two button regions 126 and 127, within which off-page buttons can be added during configuration of the user interface. The page 102 also includes an EXIT button 128, which will remove the page 102 from the display, thereby permitting the operator to see whatever was displayed before the page 102 was displayed. The MORE page 102 also includes a SYSTEM button 129, which effects page flip to the PANEL page 103 of FIG. 5.

In FIG. 5, the PANEL page 103 includes a PANEL SETUP button 136, which effects a page flip to a different page, which is not necessary to an understanding of the present invention, and which is therefore not illustrated and described in detail here. The page 103 also includes a battery charge indicator 137, with a line 134 that is moved. vertically by the remote 12 in order to indicate the amount of electrical charge remaining in the battery of the remote 12. Page 103 further includes SYSTEM ON and SYSTEM OFF buttons 138 and 139, which can optionally be configured to turn on power to all of the devices 16 and 17 in the system and to turn off power to all of the devices 16 and 17, as discussed later. Adjacent each of the buttons 138 and 139 is an exclamation point 142 or 143, which is a reminder to the operator of the personal computer 13 that, during configuration, he or she should either delete the buttons 138 and 139, or configure them to do appropriate power control. This will be discussed in more detail later. Exclamation points of this type appear only on the display 71 during system configuration, and will not be carried over to the program for the remote 12.

The page 103 also includes a PANEL SLEEP button 146, which will put the hand-held remote 12 into a low power mode. Further, the page 103 includes an EXIT button 147, which will cause the page 103 to be removed from the display 49, thereby restoring to visibility the MORE page 102 which was being displayed when the operator requested the PANEL page 103 by actuating the button 129.

The EXTERNAL BUTTON page 104 in FIG. 6 has four external buttons 151–154, which respectively correspond to the external buttons 51–54 (FIG. 1) provided on the remote 12. As mentioned above, the page 104 is never actually displayed on the display 49 during normal system operation, but instead is used during the creation of the user interface to specify what should happen if an operator presses any one of the external buttons 51–54 on the hand-held remote 12. The manner in which page 104 is used to accomplish this is described in more detail later.

Turning to FIG. 7, the SOURCE SELECT page 105 includes a button region 161, where off-page buttons can be added during creation of the user interface. At opposite ends of the button region 161 are scroll buttons 162 and 163. In the disclosed embodiment, the area of button region 161 is of a size which permits the display of up to four off-page buttons. If this button region contains no more than four buttons, then the scroll buttons 162 and 163 will not be needed, and will not appear in the final version of the page 105 in the user interface. This is why they are shown in broken lines in FIG. 7. On the other hand, if more than four off-page buttons are added to the button region 161 during the creation of the user interface, then the scroll buttons 162 and 163 will be visible and operational in the final version of page 105. When the scroll arrows are present, no more than four off-page buttons will be visible in the button region at any given time, but an operator of the remote 12 can use the scroll arrows 162 and 163 to scroll through and display the entire set of off-page buttons. In the disclosed embodiment, each actuation of one of the scroll buttons 162 and 163 causes the system to scroll to the next group of four buttons, but it would also be possible to effect scrolling in a different manner, for example one button at a time.

As mentioned above, pages 106–108 in FIGS. 8–10 all correspond to the AM/FM receiver 17 in FIG. 1. In this regard, the page 106 controls the AM/FM radio tuner, the page 107 controls the master volume and muting, and the page 108 controls the surround feature. In more detail, and beginning with page 106, there are six preset buttons 171–176 which can each be used to select a preset radio station. Adjacent these buttons is a label 178 which indicates that they are "Tuner Presets". The button 171 and the label 178 are handled as a group, as indicated diagrammatically by the broken line 179. More specifically, some receivers may have the capability to receive remote commands which select one of six different preset stations, in which case all of the buttons 171–176 will appear in the final version of the page 106. Other receivers may be capable of remote selection of less than six preset stations. In that case, selected tuner preset buttons will be eliminated in sequence, beginning with button 176, in order to provide only the number of buttons which are appropriate for the particular receiver. For example, if the receiver is only capable of selecting one of four preset stations by remote command, then only the buttons 171–174 will appear in the final version of the page 106. If the receiver is not capable of selecting any preset stations by remote command, then all of the buttons 171–176 will be omitted from the final version of the page 106. In this situation, since the label 178 and the button 171 are treated as a group 179, deletion of the button 171 will involve deletion of everything which is in the same group 179 as that button, or in other words deletion of the label 178. This ensures that the label 178 will be present if at least one of the preset buttons 171–176 remains in the final version of page 106, but that the label 178 will not be present if none of the buttons 171–176 remain in the final version.

Page 106 also includes a preset up button 181 and a preset down button 182, an associated label 183, and a broken line 184 indicating that the buttons 181 and 182 and the label 183 are all part of a group. If a particular receiver does not have the capability to scan upwardly or downwardly to the next preset radio station in response to a remote command, then the buttons 181 and 182 and the label 183 will all be omitted from the final version of the page 106. A later discussion explains how decisions are made as to which buttons to omit and which to keep.

As mentioned above, the page 107 in FIG. 9 is the page which controls the master volume and muting. In particular, the page 107 includes a volume increase button 187, a volume decrease button 188, and a muting button 189 that toggles muting on and off. When the page 107 is displayed, it covers the MORE button 119 and any buttons present in the button region 116 (FIG. 3). While the page 107 is being displayed, if the remote 12 does not detect any operator activity for a specified time interval such as five seconds, the remote 12 will automatically remove the page 107 from the display, so that the MORE button 119 and any buttons in the button region 116 will again be visible to the operator of the remote 12.

The page 108 in FIG. 10 controls the surround mode of the receiver. The page 108 includes four mode buttons 191–194. When one of these buttons is pressed, it turns on a respective different surround mode of the receiver. For example, the button 191 may cause the receiver to send sound to the speaker system 18 in a manner which simulates a disco, the button 192 may cause the receiver to simulate a church, the button 193 may cause the receiver to simulate an opera hall, and the button 194 may cause the receiver to simulate a jazz club, as discussed later. Adjacent the buttons 191–194 are exclamation points 196–199, which remind the operator of the personal computer 13 that some configuration may be required with respect to each of the buttons 191–194 during the creation of the user interface.

The page 108 also includes center volume increase and decrease buttons 201 and 202, and an associated label 203, the buttons 201 and 202 controlling the volume for speakers of the speaker system 18 which are on opposite sides of the center of the room, relative to the volume for speakers of the speaker system which are at the front of the room. Similarly, the page 108 includes rear volume increase and decrease buttons 201 and 207, and an associated label 208, the buttons 206 and 207 adjusting the volume of speakers at the rear of the room relative to the volume of speakers at the front of the room. These volume control buttons 201–202 and 206–207 are different from the master volume control buttons 187 and 188 in FIG. 9, which adjust the volume for all of the front, center and rear speakers by the same amount.

Page 108 also includes a SURROUND OFF button 212, which causes the receiver 17 to turn off its surround feature. Further, the page 108 includes an EXIT button 213, which causes the page 108 to be removed from the display 49, which in turn results in visibility of the page that was displayed at the time the page 108 was called up for display.

In page 108, the label "MODE" below the buttons 191–194 is grouped with the button 191, in a manner similar to the manner in which the label 178 in FIG. 8 is grouped with the button 171. Summarily, the labels 203 and 208 are respectively grouped with the button pairs 201–202 and 206–207. Groupings of this type have already been described in association with FIG. 8, in order to illustrate the concept. Accordingly, groupings of this type are not described in detail for all of the other pages which may include similar groupings.

Turning to the DSS 16 (FIG. 1), the corresponding pages 109–111 are shown in FIGS. 11–13. Page 109 includes a button group 221, which is used to transmit cursor control information to the DSS 16, and a channel/page button group 222, which is used to transmit channel and page information to the DSS 16. A GUIDE button 223 is used to tell the DSS 16 to display a channel selection guide. An EXIT button 224 is used to tell the DSS 16 to exit from a particular operational mode. It should be noted that the EXIT button 224 relates to a command to the DSS 16, rather than a page flip request to the remote 12, and thus does not cause the remote 12 to remove the page 109 from the display. The page 109 includes a MORE button 227, which causes a page flip that brings up the page 111 of FIG. 13. It should be noted that the MORE button 227 does not effect a page flip to the MORE page 102 of FIG. 4. The page 109 further includes a button 228, which effects a page flip to the page 110 shown in FIG. 12.

Looking now at FIG. 12, the page 110 includes a group of eleven buttons 231, which are used to enter numerical information for use by the DSS 16. Further, the page 110 includes a GUIDE button 232, an EXIT button 233, and a MORE button 236, which are respectively equivalent to the buttons 223, 224, and 227 of page 109 in FIG. 11. The page 110 also includes an arrowhead shaped page flip button 237, which effects a page flip to the page 109 shown in FIG. 11.

The page 111 in FIG. 13 includes a group of five buttons 241–245, which each correspond to various commands for the DSS 16. In a manner similar to that described above for the page 107 (FIG. 9), the page 111 of FIG. 13 is configured to be automatically removed from the display if the remote 12 detects no operator activity for a specified time interval such as five seconds.

The manner in which the interface generation program 86 (FIG. 2) is executed by the personal computer 13 (FIG. 1) to carry out generation of a user interface will now be described with the reference to the flowchart of FIG. 14. In block 251, the program 86 prompts the operator of the computer 13 to select one of the user interface templates 77–78 from the template database 76. This may be done by displaying a list of the templates, so that the operator may select one of the templates in the list. The displayed list may be accompanied by representative graphical image information that will help the operator make a decision. For example, if the operator selects a template which is in color, the operator will see a representative image which is in color, whereas if the operator selects a template which is in black and white, the operator will see a representative images which is a gray scale image. For purposes of this discussion, it is assumed that the operator selects template 77. As soon as the operator selects one of the templates, the program 86 may copy to the touch panel file 87 the default page definitions that are used in generating every user interface, regardless of which particular items of equipment are selected for use in the particular system. In the case of the exemplary embodiment of FIG. 1, this would include the definitions for pages 101–106 (FIGS. 3–8).

Figure 14:
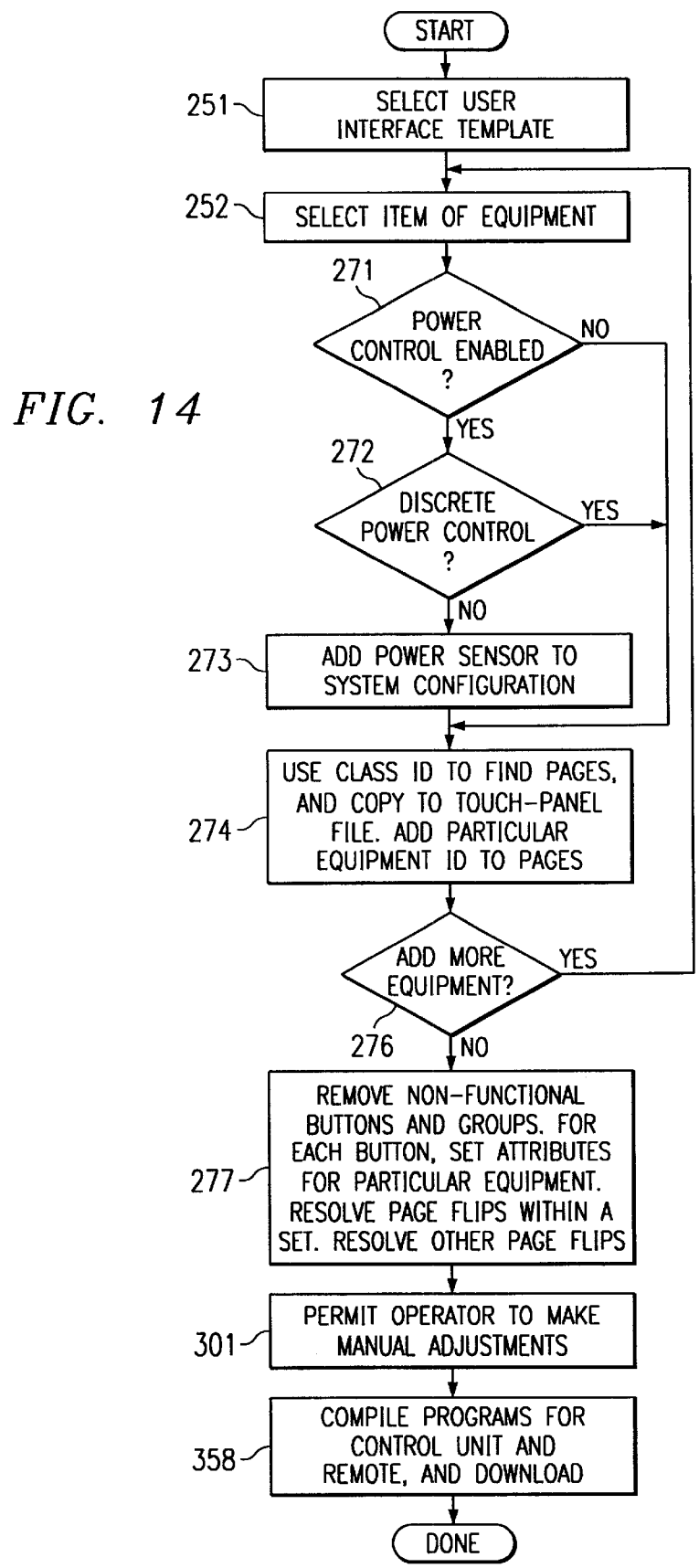
FIG. 14 is a flowchart of a program executed by a personal computer which is a component of the system of FIG. 1.

In FIG. 14, control then proceeds to block 252, where the program prompts the operator to select an item of equipment which is to be one of the devices controlled by the system. In other words, the program prompts the operator to select one of the device definitions 82–83 in the equipment database 81 (FIG. 2). In order to facilitate this selection, the program may present on the display 76 a selection window similar to that shown at 254 in FIG. 15.

Figure 15:
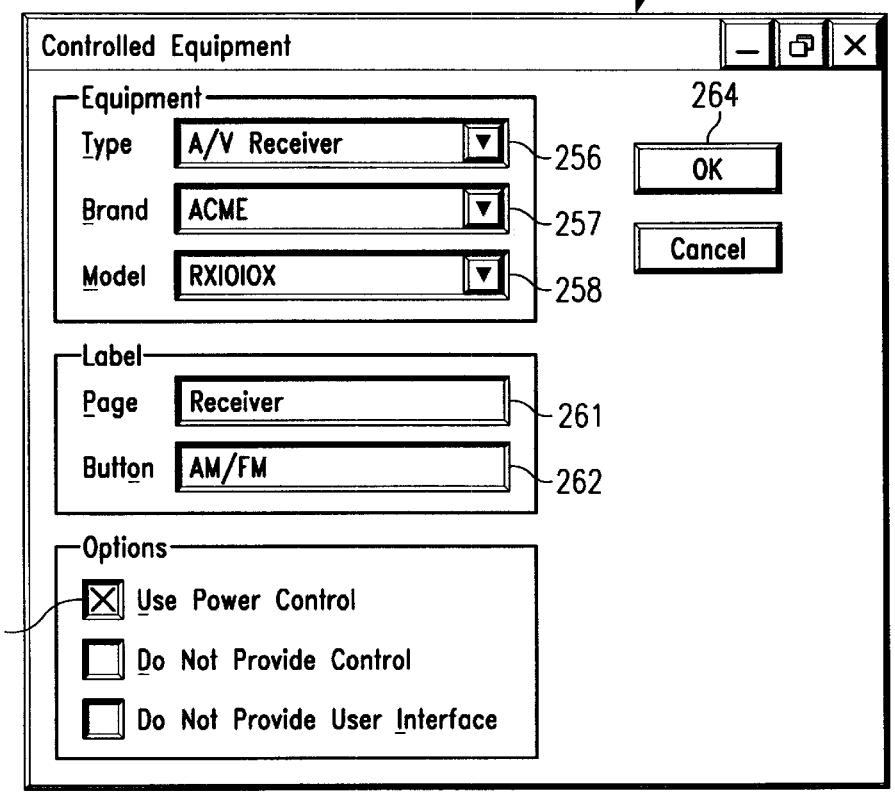
FIG. 15 is a diagrammatic view of a window which is displayed by the computer in association with execution of the program represented by the flowchart of FIG. 14.

With reference to FIG. 15, the selection window 254 includes a drop-down list 256 of classes of equipment. The operator uses this list to select the class of equipment which is of interest, for example a VCR, a television a slide project, a digital satellite system, a compact disk player, a cassette tape deck and so forth. Once the class or type of equipment has been selected using the drop-down list 256, a further drop-down list 257 will display the names of manufacturers who market approved equipment of this particular class or type. The operator then uses the drop-down list 257 to select the name of the manufacturer of the particular device which is being added. A further drop-down list 258 then displays the model numbers of the devices which are in the selected class and which are made by the selected manufacturer. The operator then selects the exact model number of the particular device being added.

Boxes 261 and 262 give default labels for the page or pages which will be associated with this particular device, and which will be associated with the SOURCE SELECT button that will appear in the button region 161 of page 105 (FIG. 7) for this particular device. The operator does not need to change these default values, but may optionally do so. If, however, the operator intends to add more than one piece of equipment in a particular class, then the operator should use different labels in box 261 for each pf these device, and different labels in box 262, so that the respective pages which correspond to one of these devices can be easily distinguished from the pages which correspond to the other. For example, if the particular system configuration included two VCRs, the operator might set box 261 to "VCR1" for one VCR and to "VCR2" for the other VCR, and do the same with box 262.

The window 254 further includes a box 263, which the operator can use to indicate whether or not the control unit 11 is to be allowed to turn on and off the power of the particular device which is being added. Once the operator has made all of the necessary selections in window 254, the operator activates an OK button 264, to tell the program that selection of this particular item of equipment is completed. With respect to the exemplary embodiment of FIG. 1, the operator would use the window 254 of FIG. 15 to successively select the DSS 16, and the receiver 17.

In FIG. 14, control then proceeds from block 252 to block 271, where the program checks to see whether power control was enabled by the operator in box 263 of window 254. If so, then control proceeds to block 272, where the program checks the remote control data (Table 2) in the device definition (Table 1) for that particular device, in order to determine whether channel codes are defined for the function codes 27 and 28, which are the discrete power on and discrete power off IR commands. These discrete power control commands each have the effect of forcing the device to either a power on state or power off state, regardless of what power state the device is currently in. This is different from the power toggle command represented by function code 9 in Table 2, which simply causes the control device to change from its current power state to the opposite power state. If it is determined at block 272 that the particular device does not support the discrete power control commands represented by the function codes 27 and 28, then control proceeds to block 273 where the program 86 automatically adds to the system configuration the power sensor 21 for that particular device. Control then proceeds to block 274. If the operator had not enabled the power control in box 263 (FIG. 15), then control would have proceeded directly from block 271 to block 274. Similarly, if it had been determined at block 272 that the particular device did support discrete power control using IR commands corresponding to function codes 27 and 28, then control would have proceeded directly from block 272 to block 274.

As discussed above in association with the explanation of Table 1, the device definition extracted from the equipment database 81 for the selected item of equipment includes an identification of its equipment class, which of course will be the same as the equipment class which the operator selected in list 256 (FIG. 15). Further, as discussed above in association with Table 4, each page definition in the template includes an equipment class identification. At block 274, for the program 86 searches the selected template definition 77 for all page definitions which contain that same equipment class identification, and then copies these page definitions to the touch-panel file 87 (FIG. 2). In the case of the exemplary embodiment of FIG. 1, this includes the page definitions containing the initial image definitions 106–108 (FIGS. 8–10) for the receiver 17, and the initial image definitions 109–111 (FIGS. 11–13) for the DSS 16.

As previously explained with reference to Table 4, each page definition includes an entry that can be set to identify the particular item of equipment with which it is associated. In each such page which has just been copied to the touch-panel file 87, this particular equipment identification entry is set using the page label that the operator specified in box 261 (FIG. 15). Control then proceeds to block 276. At this point, the user may indicate that another item of equipment is to be added, in which case control proceeds back to block 252. Alternatively, the user may indicate that the user interface is to be configured using the items of equipment which have been added so far, in which case control proceeds to block 277. In the case of the exemplary system configuration shown in FIG. 1, the operator will have added the DSS 16 and receiver 17 before control proceeds to block 277.

Figure 16:
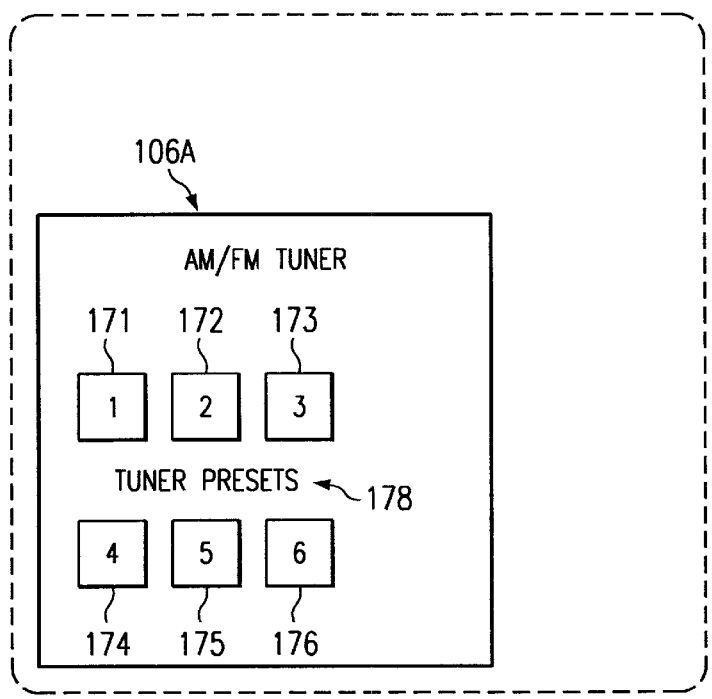
FIGS. 16–19 are modified versions of the initial images shown in FIGS. 7–8 and 3–4.

In block 277, the program carries out some automatic customization of the initial image definitions present in the page definitions that have been copied to the touch-panel file 87. In the case of the exemplary embodiment of FIG. 1, these are the initial image definitions depicted in FIGS. 3–13. First, the program removes non-functional buttons and groups. For example, in the case of the receiver 17, assume that the system determines from the information corresponding to Table 2 that there is control data corresponding to the function codes 11–14, but no control data corresponding to the function codes 15–20. This tells the program that the selected receiver 17 supports remote control of four presets. The program will therefore automatically remove the fifth and sixth preset buttons 175 and 176 from the page 106 (FIG. 8). In a similar manner, assume the program determines that, for the receiver 17, there are no channel codes corresponding to function codes 22 and 23. The program will remove the buttons 181 and 182 as well as the label 183 in page 106. The resulting page will appear as shown at 106A in FIG. 16.

Still referring to block 277 in FIG. 14, and with respect to buttons on pages which correspond to specific pieces of added equipment, the program will set button attributes as appropriate, based on information specific to that equipment. For example, as shown in Table 1, the device definition for each device has button attribute information, one example of which is how the feedback flag is to be set for each button. Accordingly, in the copies of the corresponding page or pages for that equipment which are located in the touch-panel file 87, the program sets attribute information such as the feedback flag (Table 5), based on the attribute information specified in the device definition (Table 1).

Then, still with reference to block 277, the program resolves page flips within each page set. As discussed above in association with Table 5, button definitions which effect a flip within a page set include target page identification information, and resolving these pages flips involves using this target page identification information to formally link the particular button to the target page within that set.

The next task carried out by the program 86 is to resolve other page flips. This includes the addition of off-page buttons to various button regions. When adding an off-page button, the program begins by consulting the off-page button list in the page definition for each page (Table 4), which is simply a list of region numbers to which an off-page button is to be added. For each region number in the list, the program takes the region number and then searches the page definition of every other page to see if the list of button regions for each such page includes the region number in question. If it does, then an off-page button is added to that region on that page, the appearance and operation of the off-page button being determined by information obtained from the section of the template definition (Table 3) which sets forth attributes for off-page button. If more than one page subscribes to the button region to which a particular off-page button is to be added, then the off-page button is added to that button region on each page which subscribes to the button region. As to any such button region, if the addition of the off-page button would cause the button region to contain more buttons than can be displayed at the same time on the corresponding page, then the program consults the definition of that button region in the template definition (FIG. 3) to determine what to do. In this regard, if the button region definition indicates that scrolling is supported, then appropriate scroll buttons are added, for example the scroll buttons shown at 162 and 163 in FIG. 7. Otherwise, if scrolling is not supported, the operator will be advised that the capacity of a button region has been exceeded.

Figure 17:
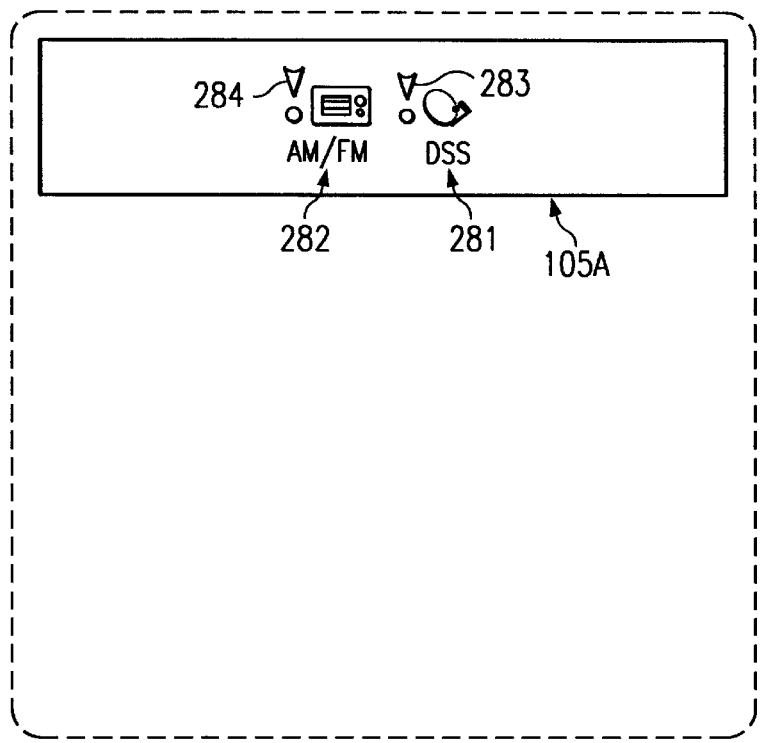

In the case of the exemplary system shown in FIG. 1, the page definition of the page 109 (FIG. 11) for the DSS 16 specifies that an off-page button is to be added in the region 161 of the SOURCE SELECT page 105 (FIG. 7). Similarly, the page definition of the page 106 (FIG. 8) for the receiver 17 specifies that an off-page button is to be added in the button region 161 of the page 105. The program 86 therefore adds each of these off-page buttons to the button region 161, resulting in the page shown at 105A in FIG. 17. In particular, the off-page button for the DSS is shown at 281, and the off-page button for the receiver 17 is shown at 282. The text on each button is the text which the operator entered in box 262 of the window 254 (FIG. 15). Adjacent to each of these buttons is a respective exclamation point 283 or 284, which reminds the operator that some configuration is possible with respect to the button as the generation of the user interface proceeds, as discussed below.

Figure 18:
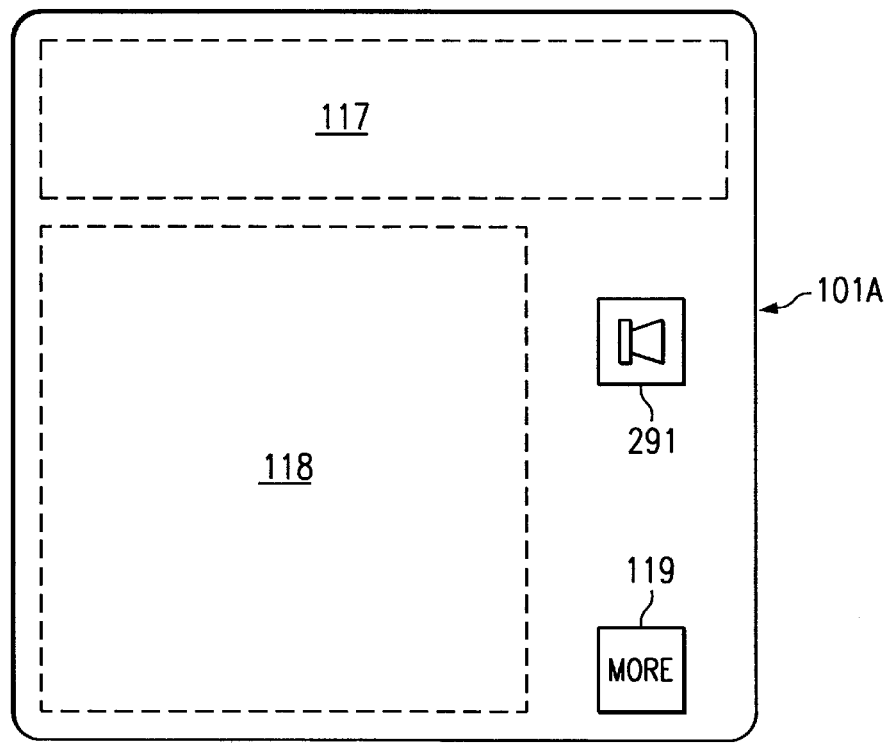
Figure 19:
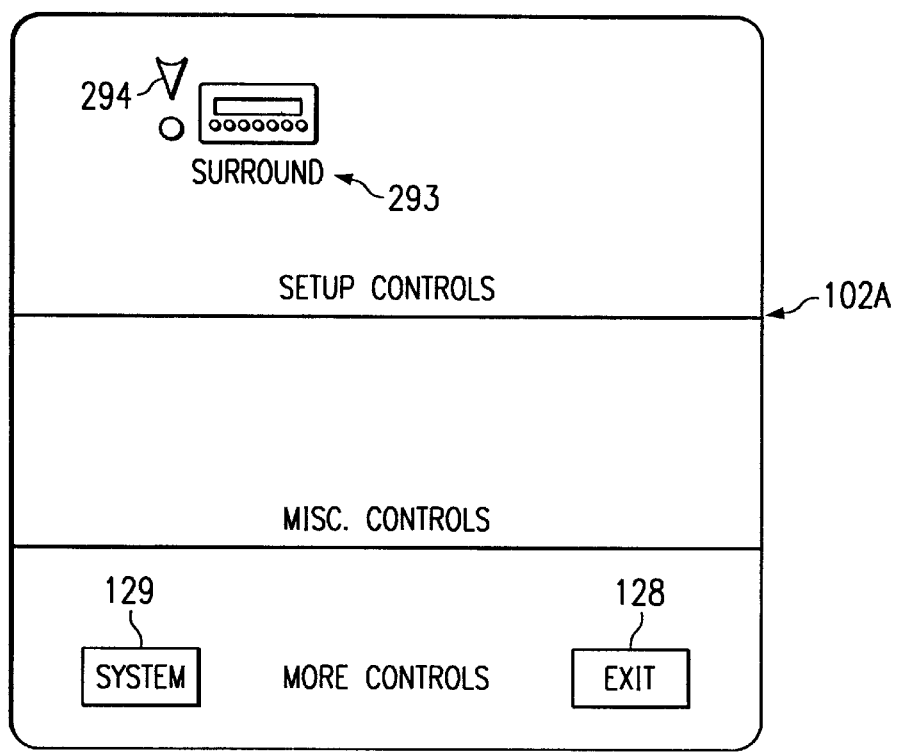

In a similar manner, the volume control page 107 (FIG. 9) for the receiver 17 requires that an off-page button be added to the button region 116 of page 101 (FIG. 3). The resulting customized version of the page is shown at 101A in FIG. 18, where the added off-page volume button is shown at 291. Activation of this button results in a page flip that causes the page 107 (FIG. 9) to be displayed. The remaining page associated with the receiver is the page 108 (FIG. 10), the page definition for which indicates that an off-page button is to be added to the button region 126 of the MORE page 102 (FIG. 4). The program therefore adds this off-page button to the button region 126, and the resulting modified page is shown at 102A in FIG. 19, with the added off-page button appearing at 293. Adjacent to button 293 is an exclamation point 294, to remind the operator that configuration is possible with respect to button 293 during the creation of the user interface.

Figure 20:
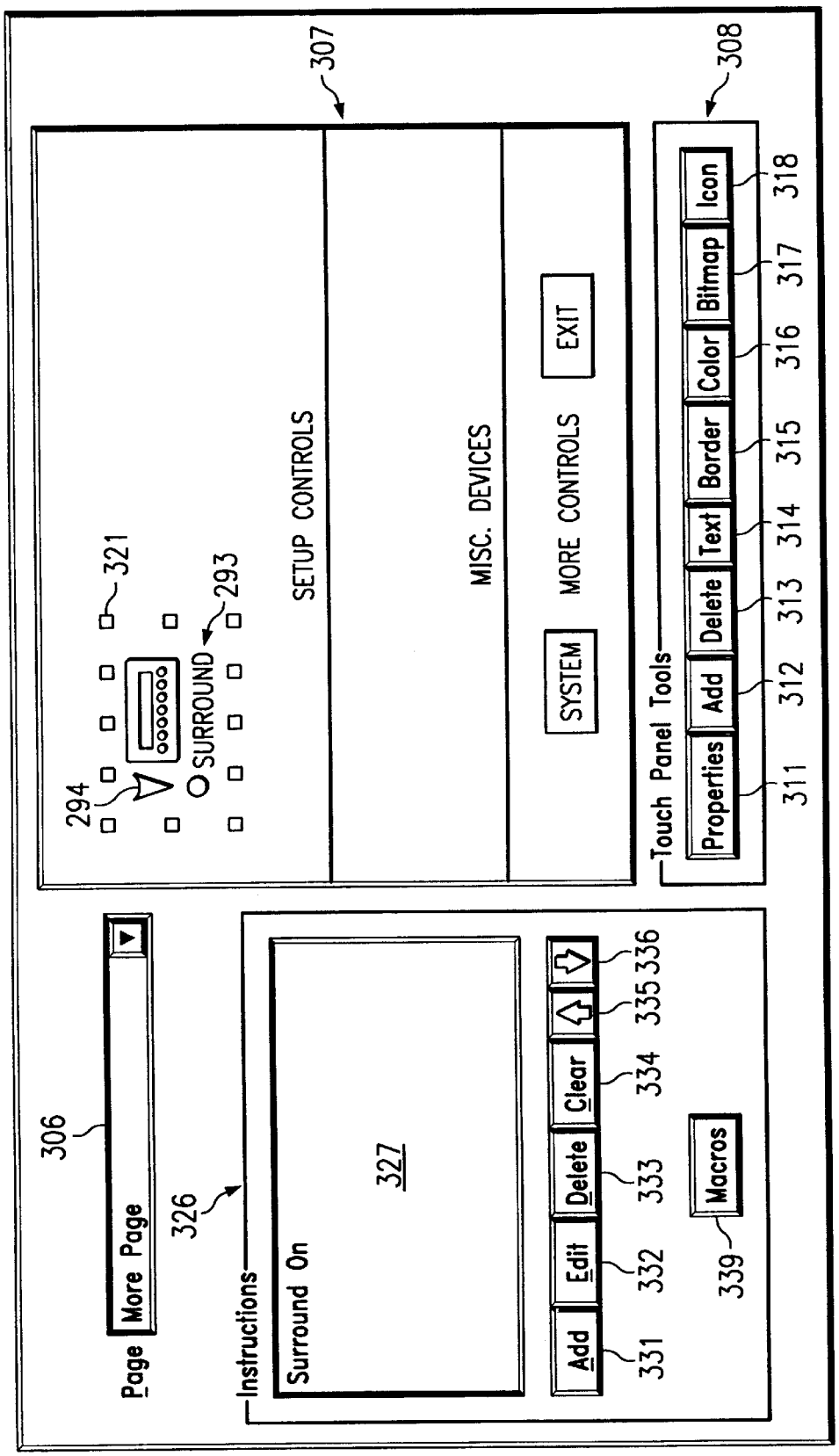

Referring again to FIG. 14, when the addition of off-page buttons has been completed, program control proceeds from block 277 to block 301, where the program permits the operator to make certain manual adjustments to the user interface. More specifically, with reference to FIG. 20, the operator can bring up on the display 71 a window 304 that facilitates changes to the page definitions in the touch-panel file 87. The window 304 includes a drop-down list 306 of all the page definitions in the touch-panel file 87, which the operator can use to select one of these pages for editing. An image of that particular page will then be displayed in a region 307 of the window 304. In FIG. 20, region 307 is shown displaying the MORE page 102A of FIG. 19. Using a pointing device such as the mouse 68, the operator can select a button. In FIG. 20, the operator has selected the button 293, and the program confirms this to the operator by placing a temporary frame of dots 321 around the selected button 293. Below the region 307 is a tool section 308, which can be used to carry out editing in regard to buttons. More specifically, the tool section 308 includes eight buttons 311–318, which can be respectively used to: adjust the properties associated with the selected button, add a new button, delete the selected button, change text associated with the selected button, change the appearance of the border of the selected button, change the color used in association with the selected button, change a bitmap associated with the selected button, or change an icon associated with the selected button.

The window 304 also includes an instruction section 326. As discussed above in association with Table 5, the button definition for each button can include a list of instructions which are to be carried out when that particular button is actuated. The instruction section 326 includes a region 327, where the list of instructions for the currently selected button is displayed. In the example of FIG. 20, there is currently only one instruction in the list, which is the "Surround On" instruction. The instruction section 326 includes six buttons 331–336, which can respectively be used to: add instructions, edit instructions, delete one or more highlighted instructions, clear the list by deleting all instructions, scroll upwardly through the list, or scroll downwardly through the List. A further button 339 permits the use of macros, but the macro capability is not essential to an understanding of the present invention, and is therefore not described here in detail.

In order to facilitate an explanation of the capability provided to the operator for adjusting the list of instructions, reference is made to Table 6, which shows an exemplary list of instructions that might be provided in the device definition (Table 1) for the particular receiver 17 shown in FIG. 1. It should be noted that there is not necessarily a one-to-one correspondence between the instructions in Table 6 and the available remote functions of the receiver 17. For example, as discussed above, it has been assumed for purposes of explaining the present invention that the particular receiver 17 shown in FIG. 1 has the capability to respond to a remote power toggle IR command (function code 9 in Table 2), but does not have the capability to respond to discrete power on and power off IR commands (function codes 27 and 28 in Table 2). Table 6, however, shows that the list of available instructions provided in the device definition (Table 1) for the receiver 17 includes not only a "power toggle" instruction, but also a "power on" instruction and a "power off" instruction. The manner in which the latter two instructions are implemented is discussed later.

Figure 21:
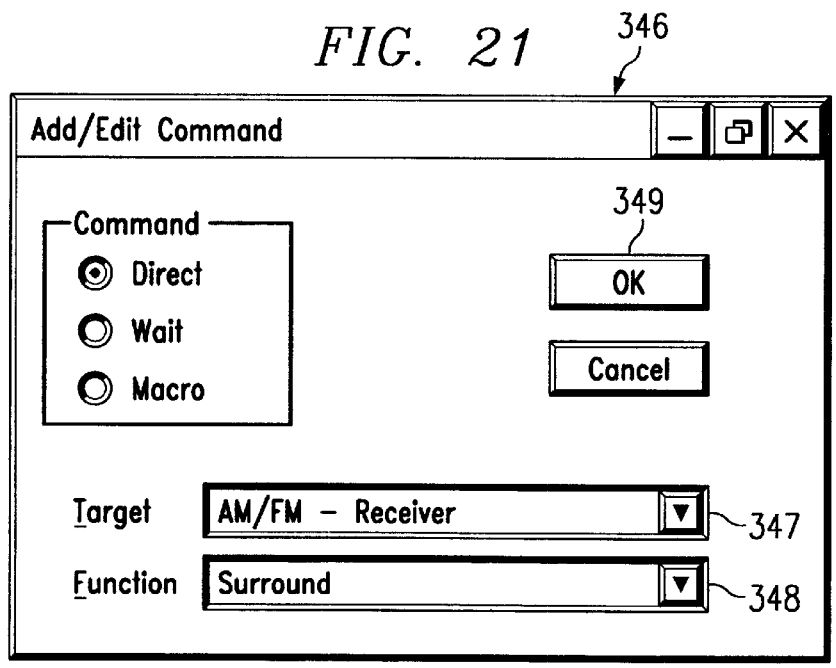
FIGS. 20–21 are diagrammatic views of windows presented in association with execution of the program represented by the flowchart of FIG. 14.

In order to add an instruction to the list of instructions displayed in the region 327 of the window 304, the operator can actuate the ADD button 331, which brings up another window 346, which is shown in FIG. 21. The window 346 includes a drop-down list 347, which lists all of the specific devices that the operator has indicated are to be in the system. For example, with respect to the exemplary system configuration shown in FIG. 1, the list 347 would identify the DSS 16 and the receiver 17. The user thus uses the list 347 to select the device to which a command is to be sent. Once the device is selected, a further drop-down list 348 displays all of the instructions which are provided in the device definition (Table 1) for the selected device, so that the user can select from the list the specific instruction which is to be added. After the user has made appropriate selections in boxes 347 and 348, the user actuates an OK button 349, in order to implement the selection and then return to the window 304 of FIG. 20, where the selected instruction will have been added to the list in region 327.

Figure 22:
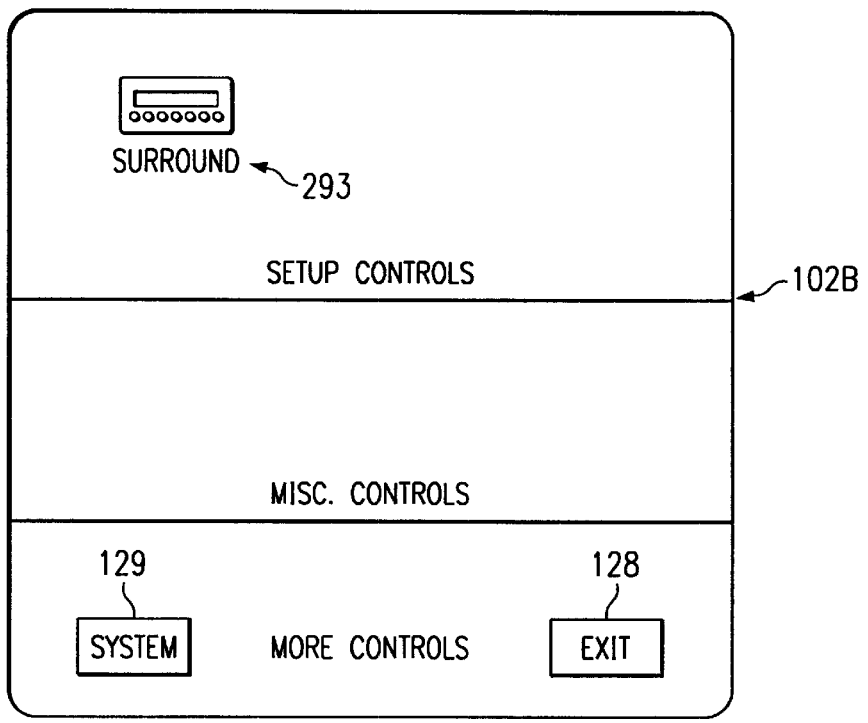
FIGS. 22–25 are modified versions of the images respectively shown in FIGS. 4, 10, 7 and 5.

The operator is allowed to edit the instruction list associated with any button on the pages in the touch-panel file 87. In this regard, the operator should give special consideration to each button which has an exclamation point displayed next to it. For example, with reference to each of FIGS. 19 and 20, the button 293 has next to it an exclamation point 294. In general, when the button 293 is actuated in order to effect a page flip to the page which controls the surround mode of the receiver, it may be appropriate for some receivers to make sure that the surround mode is in fact turned on. This is because certain IR codes may have different effects on the receiver, depending on whether or not the receiver is in the surround mode. For example, in some receivers, certain IR codes will select the particular surround mode to implement if the receiver is in the surround mode, but will select a respective radio station preset if the receiver is not in the surround mode. Accordingly, if the instruction list displayed at 327 for the button 293 did not happen to include the "Surround On" instruction, the operator could add this instruction. Once the operator has selected a button, such that it is surrounded by the frame 321, the associated exclamation point 294 will disappear when the operator thereafter selects a different button or a different page. Consequently, with respect to the MORE page which is shown at 307 in FIG. 20, after the operator has selected the button 293, and then selects something else, the exclamation point will disappear, and the page will thereafter appear as shown at 102B in FIG. 22.

Figure 23:
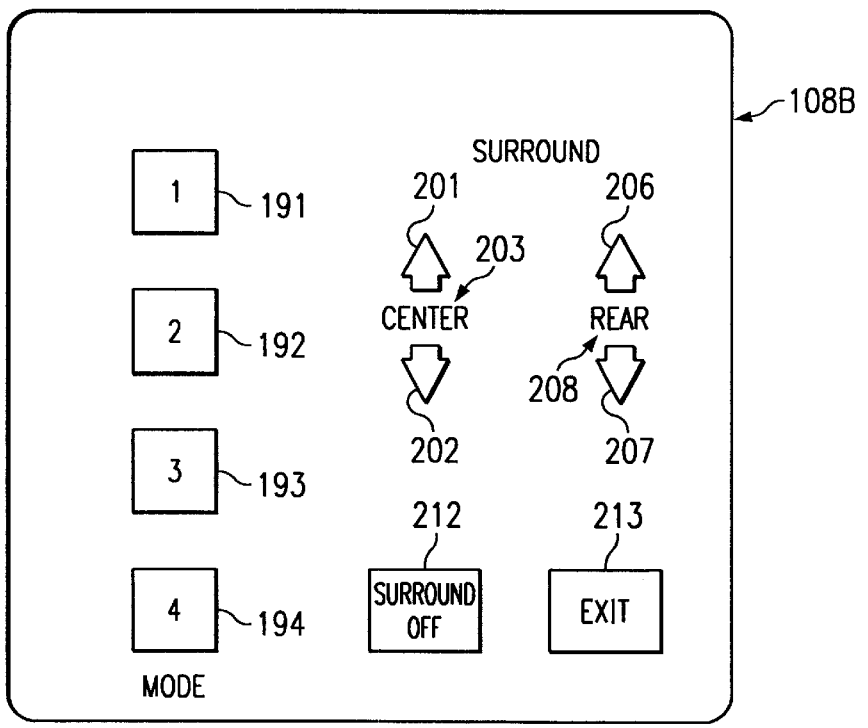
Figure 24:
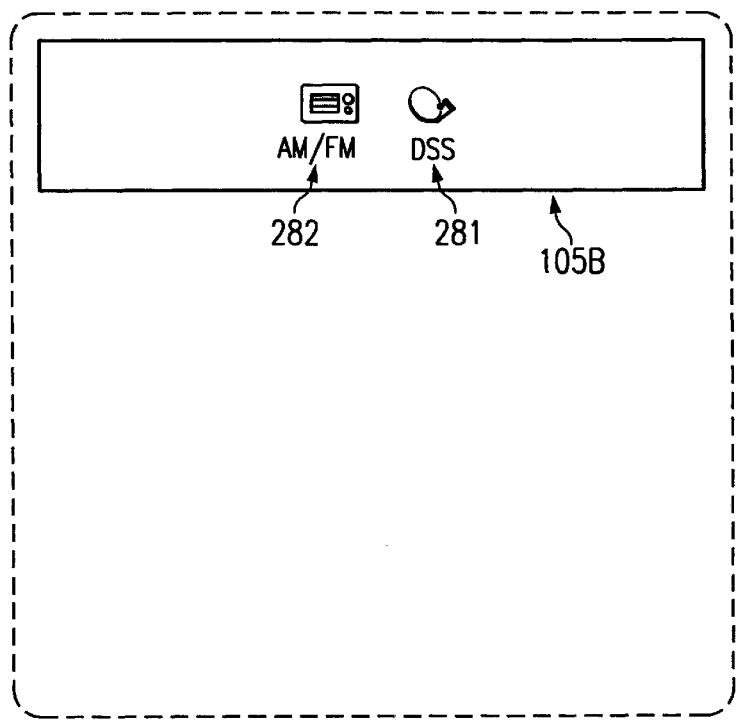

In a similar manner, with reference to FIG. 10, the list of instructions for each of the MODE select buttons 191–194 can be adjusted, for example to selectively control which surround mode of the receiver 17 is invoked by each such button. Thus, for example, the buttons 191–194 may be respectively associated with the instructions "4-Disco", "2-Church", "1-Opera", and "3-Jazz Club" (Table 6). After the operator appropriately reviews and/or adjusts the list of instructions for each such button, the associated exclamation points 196–199 will no longer be displayed, and the appearance of the page will be as shown at 108B in FIG. 23. In a similar manner, the operator will review and/or adjust the list of instructions for each of the buttons 281 and 282 in the page 105A of FIG. 17, resulting in the deletion of the exclamation points 283 and 284. The page will thereafter appear as shown at 104B in FIG. 24.

Figure 25:
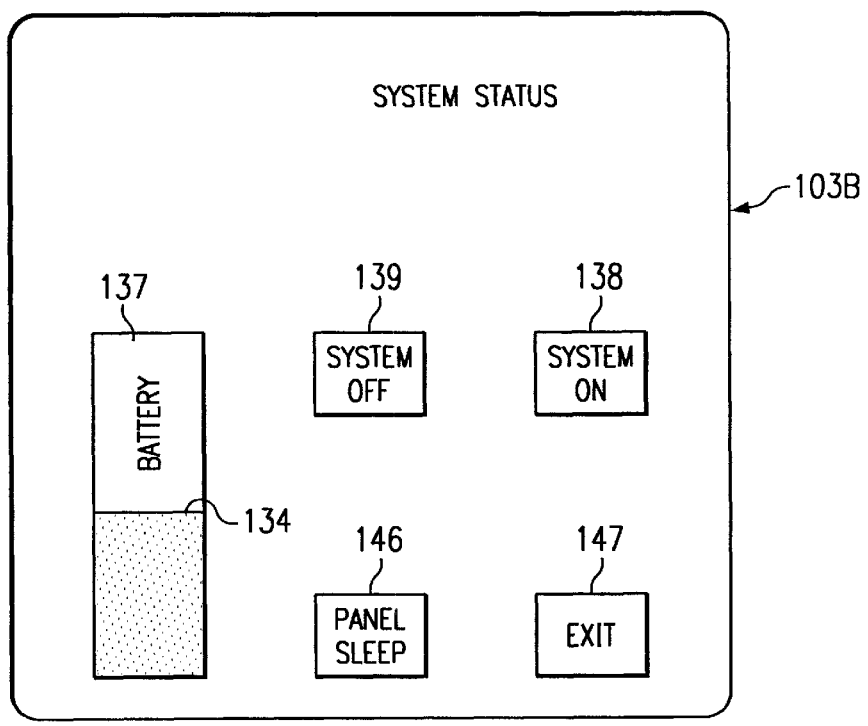

With reference to the page 103 in FIG. 5, the PANEL SETUP button 136 effects a page flip to a page which is provided primarily for dealers or support personnel, and which is not needed for normal system operation. Therefore, the person running the program 86 may decide to use button 313 in FIG. 20 to delete the button 136, in order to prevent a page flip which is irrelevant to normal system operation. Moreover, the instruction lists for each of the buttons 138 and 139 should be reviewed and/or adjusted, resulting in the deletion of the exclamation points 142 and 143. The page will thereafter appear as shown at 103D in FIG. 25. In regard to the buttons 138 and 139, they are each intended to provide the capability to use a single button to turn on the power to all of the controlled devices, or to turn off the power to all the controlled devices. In order to achieve this, the instruction list for the button 138 would be set up to include for each controlled device a respective discrete power control instruction which turns on the power to that device. Similarly, the instruction list for the button 139 would be set up to include for each controlled device a discrete power control instruction which turns off the power for that device. With reference to FIG. 6, the operator can optionally edit the instruction lists associated with the buttons 151–154, in order to define what the external buttons 51–54 on the remote 12 will do when they are actuated.

With respect to the instruction lists, the operator is permitted to change the order of the instructions in the list. Further, the operator is permitted to add wait or pause instructions, which cause the control unit 11 to wait for a specified interval before carrying out the next instruction in the instruction list. For example, in the case of a slide projector, it may be desirable to insert a pause instruction after the instruction which turns off the bulb and before the instruction which turns off the fan, to create a delay of a minute or so to allow the fan to help cool the bulb.

Referring again to FIG. 14, when the operator has completed all manual adjustments at block 301, program control proceeds from block 301 to block 358, where the program 86 (FIG. 2) in the computer 13 prepares the respective programs which will be downloaded into the memories 27 and 58 (FIG. 1) of the control unit 11 and the remote 12, using the information which is present in the touch-panel file 87. In this regard, the program prepared for the memory 58 in the remote 12 will include the capability required to selectively present on the display 49 the pages 101A (FIG. 18), 102B (FIG. 22), 103B (FIG. 25), 105B (FIG. 24), 106A (FIG. 16), 107 (FIG. 9), 108B (FIG. 23), 109 (FIG. 11), 110 (FIG. 2), and 111 (FIG. 13). The program in memory 58 will also include the capability to effect appropriate page flips among these pages. As mentioned above, the EXTERNAL BUTTON page 104 (FIG. 6) is never displayed on the display 49, but the program in memory 58 will include the capability to respond to the external buttons 51–54 by carrying out the instructions in the instruction lists respectively associated with the buttons 151–154 on the page 104. The program in memory 58 will further include the capability to respond to the actuation of various buttons by sending wireless IR commands at 33 to the master control unit 11. As discussed above, each such wireless command includes an identification of the particular remote 12 which originated the command, and a channel code which identifies the task to be carried out by the control unit 11.

The program prepared for the program memory 27 in the control unit 11 includes the capability to accept commands received at 33 from the remote 12, to then use the channel code in the command to determine the particular task to be carried out, and to then carry out that task relative to the control devices, using the IR ports 32, input ports 41 and output ports 42.

In this regard, a brief discussion is needed of how the program in the memory 27 implements discrete power on, discrete power off, and power toggle capabilities for each device. In the exemplary system configuration shown in FIG. 1, and as discussed above, the receiver 17 is assumed to be responsive to a remote power toggle IR command (function code 9 in Table 2), but not the remote IR commands which effect discrete power control (function codes 27 and 28 in Table 2) The power sensor 21 is therefore provided to indicate at 43 whether the power in the receiver 17 is currently on or off. Portions of the program provided in memory 27 to effect power control for the receiver 17 are therefore shown in FIGS. 26–28. The program segment in each of FIGS. 26–28 is executed in response to receipt from the remote 12 of a respective channel code corresponding to the receiver 17.

Figure 26:
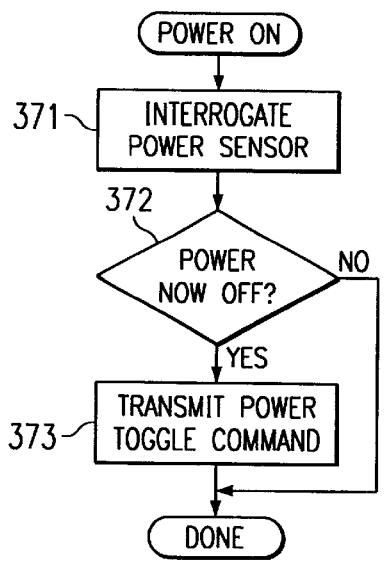
FIGS. 26–31 are flowcharts which each show a respective different technique used by the system of FIG. 1 to implement power control with respect to a controlled device.

More specifically, FIG. 26 shows the program sequence which effects a discrete power on operation. At block 371, the control unit 11 uses the input port 41 and the line 43 to interrogate power sensor 21, in order to determine the current power status of the receiver 17. The result is evaluated at block 372 and, if the power is currently off, then the IR code to effect a power toggle is sent across cable 37 to the receiver 17 in block 373, so that the receiver 17 changes state from off to on. On the other hand, If it is determined at block 372 that power in the receiver 17 is currently on, then no IR command needs to be sent to the receiver 17, and block 373 is skipped.

Figure 27:
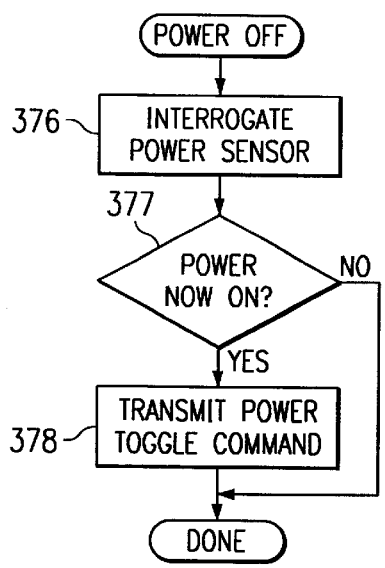

FIG. 27 shows a similar routine which is used to effect a discrete power off command. In particular, the power sensor 21 is interrogated in block 376 and, if the power is determined to be currently on in block 377, a power toggle IR command is sent across cable 37 in block 378, in order to cause the receiver 17 to toggle its power from on to off. On the other hand, if it is determined in block 377 that the power is currently off, no change is needed and block 378 is therefore skipped in order to avoid sending any IR command to the receiver 17.

Figure 28:
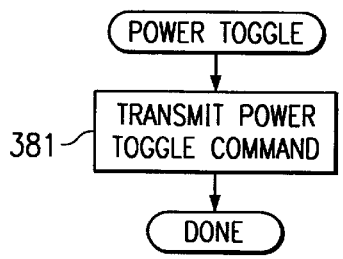

With reference to FIG. 28, the receiver 17 is responsive to the power toggle IR command. Therefore, if the control unit 11 receives at 33 a channel code requesting a power toggle for the receiver 17, the control unit 11 simply sends the power toggle IR command at 37 to the receiver 17, causing the receiver 17 to toggle its power state from off to on if it currently off, or from on to off if it is currently on.

For purposes of providing a clear explanation of the present invention, the DSS 16 in the exemplary configuration of FIG. 1 is assumed to be responsive to a discrete power on IR command and a discrete power off IR command, but not a power toggle IR command. The program prepared by computer 13 for the program memory 27 includes three program segments respectively shown in FIGS. 29–31, which correspond to three channel codes for the DSS 16 that are different from the three channel codes used to control power for the receiver 17.

Figure 29:
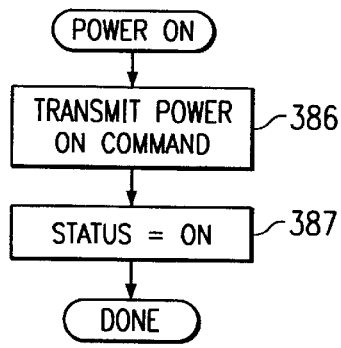
Figure 30:
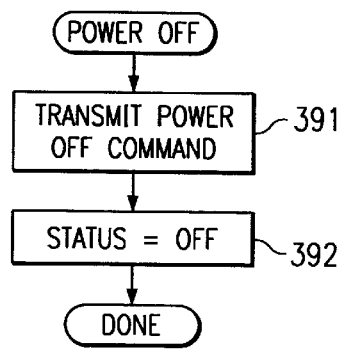

More specifically, with reference to FIG. 29, if the control unit 11 receives from the remote 12 a channel code indicating that power to the DSS 16 is to be turned on, it transmits a discrete power on IR command at block 386, and then sets a variable named "Status" to indicate that the power of the DSS 16 is currently on. Similarly, with reference to FIG. 30, if the control unit 11 receives from the remote 12 a channel code indicating that the power of the DSS 16 is to be forced off, it sends a discrete power off IR command at 391, and then sets the Status variable to indicate that the power of the DSS 16 is currently off.

Figure 31:
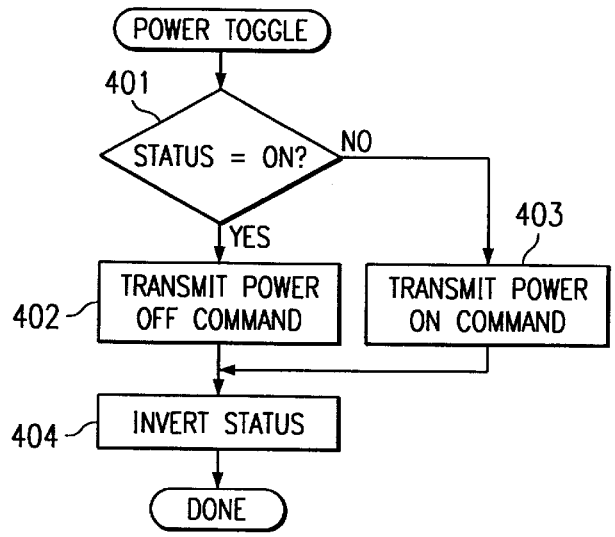

With reference to FIG. 31, if the control unit 11 receives from the remote 12 a channel code indicating that power to the DSS 16 is to be toggled, the control unit 11 checks the Status variable to determine whether the power to the DSS 16 is currently on or off. This occurs in block 401. If the Status variable indicates that power is currently on, then at block 402 the control unit 11 transmits a discrete power off IR command in order to turn off the power to the DSS 16. Alternatively, if it is determined at block 401 that the power is currently off, then at block 403 the control unit 11 transmits a discrete power on IR command in order to turn the power on. In either case, control proceeds from block 402 or block 403 to block 404, where the control unit 11 inverts the state of the Status variable in order to reflect the fact that the power state of the DSS 16 has been toggled.

In a variation of the disclosed embodiment, if one of the devices 16 and 17 was capable of responding to all of the remote IR commands for discrete power on, discrete power off, and power toggle, then a power sensor such as that shown at 21 in FIG. 1 would not be necessary for the device, it would not be necessary to use a variable such as the Status variable, and power control would require nothing more than sending one of the discrete power on, discrete power off, and power toggle IR commands, as appropriate. In yet another variation, if one of the devices 16 and 17 did not support any remote power control at all, then the operator would not be permitted to enable power control in box 263 of the window 254 (FIG. 15), no channel codes would be assigned for purposes of power control with respect to that device, and no program segments would be implemented in the memory 27 to effect power control with respect to that device.

The present invention provides a number of technical advantages. One such technical advantage is the capability to automatically customize a user interface by taking an initial image definition developed for use with any one of a number of different devices in the same equipment class, and to modify that image definition to conform it to specific characteristics of a selected one of those devices. One feature of this is the capability to delete one or more buttons which are not used by the selected device. Another feature is to associate indicia in the image with at least one button of a button group, so that the indicia will be deleted if the associated button is deleted.

A further technical advantage involves the capability to automatically take image definitions for a number of devices and to link off-page buttons to button regions in order to efficiently integrate them into a user interface. A related feature involves the capability to automatically add scrolling capability and scrolling buttons in association with a button region, if the number of off-page buttons added to that region exceeds the space available to display buttons in the region. A further advantage is that the image definition for at least one device includes pages which have a size less than the overall size of the display, so that a portion of at least one other page is visible when the reduced size page is displayed, the provision of the reduced size page and its integration into the system being effected automatically.

Still another technical advantage relates to the capability to carry out each of a discrete power on, discrete power off, and power toggle function with respect to a particular controlled device which does not inherently have the capability to perform all three of these functions. A related feature involves the automatic implementation of this capability, through use of the subset of these three commands which the device does recognize. Yet another related feature is the automatic and selective addition to the system configuration of a power sensor to facilitate this capability, in configurations where the power sensor would be helpful.

TABLE 1

| DEVICE DEFINITION |
| --- |
| Equipment Class |
| Name of Manufacturer |
| Model Number |
| Method of Control |
| Control Data (e.g. Infrared or Serial) |
| Attribute Information |
| List of Available Commands |

TABLE 2

| FUNCTION CODE | DESCRIPTION |
| --- | --- |
| 1 | Play |
| 2 | Stop |
| 3 | Pause |
| 4 | Fast Forward |
| 5 | Rewind |
| 6 | Forward Search |
| 7 | Reverse Search |
| 8 | Record |
| 9 | Power On/Off (Toggle) |
| 10 | '0' or '10' |
| 11 | '2' |
| 12 | '2' |
| 13 | '3' |
| 14 | '4' |
| 15 | '5' |
| 16 | '6' |
| 17 | '7' |
| 18 | '8' |
| 19 | '9' |
| 20 | '+10' |
| 21 | Enter |
| 22 | Channel Up or + |
| 23 | Channel Down or − |
| 24 | Volume Up or + |
| 25 | Volume Down or − |
| 26 | Mute |
| 27 | On (Power Typically) |
| 28 | Off (Power Typically) |
| 29 | TV/Video, or TV/VCR, or TV/LDP |
| 30 | TV |
| 31 | Video1, Line A, VCR1, DCP, or Input+ |
| 32 | Video2, LineB, VCR2, or Input− |
| 33 | Video3 |
| 34 | RGB1 or Tape1 |
| 35 | RGB2 or Tape2 |
| 36 | CD |
| 37 | Tune |
| 38 | Phono |
| 39 | Aux |
| 40 | AM/FM |
| 41 | Play |
| 42 | A/B |
| 43+ | Additional Unique Functions |

TABLE 3

| TEMPLATE DEFINITION |
| --- |
| Definitions ot Button Regions |
| Attributes for Off-Page Buttons |
| Page Definitions |

TABLE 4

| PAGE DEFINITION |
| --- |
| Off-Page Button List |
| List of Button Reaions on Page |
| Initial Image Definition |
| Equipment Class Identification |
| Particular Equipment Identification (Set at Runtime) |
| Default Timeout |
| Button Definitions |

TABLE 5

| BUTTON DEFINITION |
| --- |
| Attributes (Such as Bitmap, Icon, Text) |
| Channel Code (Set at Runtime) |

TABLE 5-continued

| BUTTON DEFINITION |
| --- |
| Function Code |
| Feedback Flag |
| Target Page Identification |
| List of Instructions |

TABLE 6

| EXEMPLARY RECEIVER COMMANDS |
| --- |
| Power Toggle |
| 1 - Opera |
| 2 - Church |
| 3 - Jazz Club |
| 4 - Disco |
| Master Vol + |
| Master Vol − |
| Muting |
| Power On |
| Power Off |
| Tuner |
| Phono |
| Tape |
| CD |
| Video |
| Surround On |
| Surround Off |
| Rear Vol + |
| Rear Vol − |
| Center Vol + |
| Center Vol − |
| AM/FM |
| Preset + |
| Preset − |
| User Presets |

Although one embodiment has been illustrated and described in detail, it should be understood that various substitutions and alternations can be made thereto without departing from the spirit and scope of the present invention, as defined by the appended claims.

What is claimed is:

1. A method of configuring a user interface portion of a system which controls a controlled device, comprising the steps of:

maintaining a device database which contains respective device information for each of a plurality of different devices;

maintaining an initial interface definition for a device class which includes a plurality of the devices in the database the initial interface definition including an initial image capable of being displayed on a display;

permitting an operator to select a device in the device class to be the controlled device;

automatically preparing a modified interface definition by modifying the initial interface definition based on the device information in the device database which corresponds to the controlled device; and controlling the user interface portion using an interface control definition which is a function of the modified interface definition the user interface portion including the display.

2. A method according to claim 1, wherein said initial image includes user selectable control elements, and wherein said step of automatically preparing a modified interface definition includes the step of deleting one of said control elements of said initial image.

3. A method according to claim 2, wherein said step of maintaining a device database includes the step of maintaining in said device information for said controlled device a list of control codes which are accepted by said controlled device, and wherein said step of deleting a control element is carried out as a function of said list of control codes.

4. A method according to claim 2, including the step of eliminating indicia associated with said deleted control element.

5. A method according to claim 1, wherein said step of automatically preparing a modified interface definition includes the step of setting a display attribute for said initial image as a function of said device information for said control device.

6. A method according to claim 5, wherein said display attribute is a feedback attribute which determines display characteristic for a user selectable control element.

7. A method according to claim 1, including the step of:
maintaining a further interface definition which includes a further image having a region associated with a region identifier, said initial image of said initial interface definition including a definition of an external control element which includes a region identifier;
searching for a region having a region identifier corresponding to said region identifier of said control element; and
adding to the region with the corresponding region identifier a representation of the control element.

8. A method according to claim 7, including the step of adding to said region of said further image a capability for scrolling through a plurality of control elements added by said adding step.

9. A method of configuring a user interface portion of a system which controls a controlled device, the user interface portion including a display, comprising the steps of:
maintaining a device database which identifies a plurality of different devices;
maintaining an interface database which includes information defining a plurality of images each capable of being displayed on the display, each of the devices in the device database being associated with at least one of the images, and at least one of the images having a reduced size smaller than the size of the display;
permitting an operator to select as the controlled device a device in the device database that is associated with a first said image which has said reduced size;
preparing an interface control definition which includes at least two images, one of which is said first image, said interface control definition displaying said first image by overlaying the first image over at least a portion of a second image which is one of the images in the interface control definition other than the first image; and
controlling the user interface portion using said interface control definition.

10. A method according to claim 9, including after said overlaying step the step of removing said first image from the display so that said portion of said second image becomes visible.

11. A method according to claim 10, wherein said removing step is automatically carried out following a predetermined time interval during which a user does not interact with said user interface.

* * * * *